United States Patent
Codd et al.

(10) Patent No.: US 6,421,667 B1
(45) Date of Patent: *Jul. 16, 2002

(54) DELTA MODEL PROCESSING LOGIC REPRESENTATION AND EXECUTION SYSTEM

(76) Inventors: Edgar F. Codd; Sharon B. Codd, both of 1000 Island Blvd. #2506, Adventura, FL (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/872,531

(22) Filed: Jun. 11, 1997

Related U.S. Application Data

(60) Provisional application No. 60/036,702, filed on Jan. 31, 1997, provisional application No. 60/034,206, filed on Jan. 21, 1997, provisional application No. 60/033,008, filed on Dec. 16, 1996, provisional application No. 60/030,349, filed on Nov. 6, 1996, and provisional application No. 60/019,572, filed on Jun. 11, 1996.

(51) Int. Cl.[7] .............................................. G06F 17/00
(52) U.S. Cl. ................... 707/4; 707/5; 707/6; 707/102; 709/318; 709/100; 709/106; 717/114; 706/45; 706/47; 706/56; 706/50
(58) Field of Search ...................... 707/1–206, 101–104; 717/114, 136–144; 709/100–108, 313–318; 706/46–58

(56) References Cited

U.S. PATENT DOCUMENTS

| | | | | |
|---|---|---|---|---|
| 5,548,755 A | * | 8/1996 | Leung et al. | 707/2 |
| 5,594,638 A | * | 1/1997 | Ilif | 705/30 |
| 5,615,359 A | * | 3/1997 | Yung | 707/10 |
| 5,712,960 A | * | 1/1998 | Chiopris et al. | 706/61 |
| 5,819,090 A | * | 10/1998 | Wolf et al. | 707/102 |

FOREIGN PATENT DOCUMENTS

| | | |
|---|---|---|
| WO | WO 96/02033 A | 1/1996 |

OTHER PUBLICATIONS

J. D. Ullman, "Principles of Database and Knowledge–Base Systems", vol. II: The New Technologies, Computer Science Press, 1989, pp. 983–1025.

A. V. Aho, et al., "Compilers–Principles, Techniques, and Tools," Addison–Wesley, 1986; Section 8.5, "Case Statements," pp. 497–500.

PCT International Search Report (Nov. 3, 1997).

PCT Written Opinion (Mar. 2, 1998).

C.J. Theaker, et al., "A Practical Course on Operating Systems," Macmillian, 1985; Chapter 2, "Performance of Input/Output Systems", pp. 10–17.

* cited by examiner

*Primary Examiner*—David Jung
(74) *Attorney, Agent, or Firm*—Morrison & Foerster, LLP

(57) ABSTRACT

The invention presents novel method, apparatus, and data structures for storing, maintaining, and executing processing logic on a computer system. Processing logic is encoded into its distinct, constituent elements that are flexibly linked, facilitating reuse and reconfiguration. Executable responses are selected for an input signal by identifying a correspondence between the input signal and an expression, evaluating the expression to a resulting value, and identifying a correspondence between the expression and its resulting value, and an executable response.

58 Claims, 21 Drawing Sheets

Fig. 6A

Event-type Definition Format

| 601 | 603 | 605 | 607 | 609 | 611 | 613 |
|---|---|---|---|---|---|---|
| Event-type Identifier | Time Stamp | Expression Template | Active Time | End Time | Source Identifier | ... |

Primary Key — 619

Task-type Definition Format

| 621 | 623 | 625 | 627 |
|---|---|---|---|
| Task-type Identifier | Executable Response Template | Source Identifier | ... |

Primary Key — 639

Event-to-Task Correspondence Definition Format

| 641 | 643 | 645 | 647 | 649 |
|---|---|---|---|---|
| Event-type Identifier | Task-type Identifier | Scheduled-time Expression Template | Source Identifier | ... |

Primary Key — 659

Event-to-Task Correspondence Definition Format

| 661 | 663 | 665 | 667 | 669 | 671 |
|---|---|---|---|---|---|
| Event-type Identifier | Expression Value | Task-type Identifier | Scheduled-time Expression Template | Source Identifier | ... |

Primary Key — 679

660

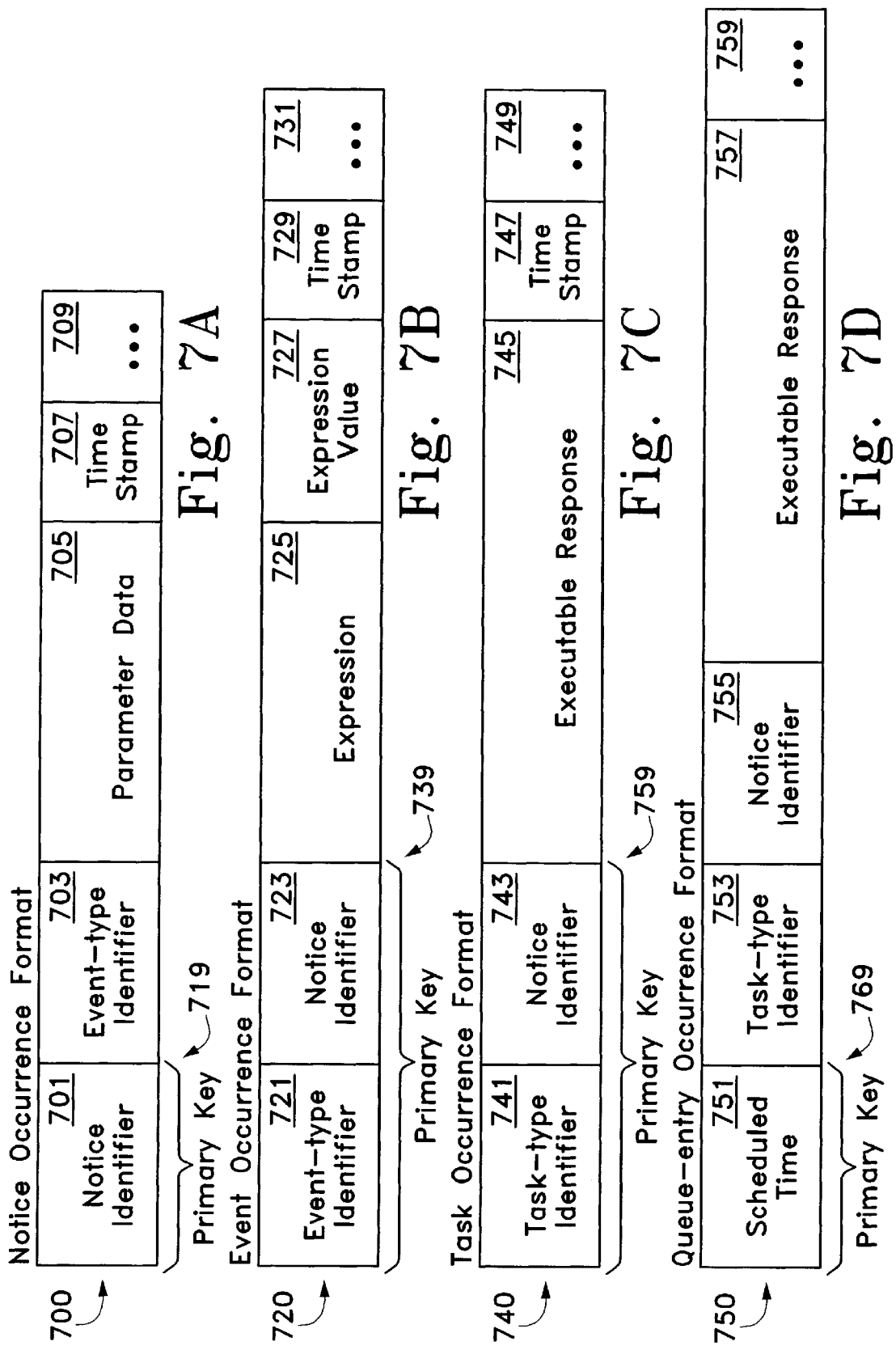

ET

| Event-type Identifier | Expression Template | |
|---|---|---|
| E10 | [INV.$PNPARM.quantity-on-hand]<[INV.$PNPARM.minimum-quantity] | |
| E20 | [INV.$PNPARM.quantity-on-hand]<([INV.$PNPARM.minimum-quantity]/2) | |
| ... | ... | ... |

| Task-type Identifier | Executable Response | |
|---|---|---|
| T11 | SQL: Insert requisition record; SQL: Insert E20 notice record | |
| T12 | PRG: execute forecasting program for this part | |
| T21 | PRG: execute program to send email message to buyer of this part | |
| ... | ... | ... |

Fig. 10B

| ETCORR 1040 | | Execution Time Expression Template | |
|---|---|---|---|
| Event-type Identifier | Task-type Identifier | | |
| E10 | T11 | 1042 | 1044 ... |
| E10 | T12 | $$today:22:00:00 1050 | 1052 ... |
| E20 | T21 | 1058 | 1060 ... |
| | 1048 | 1058 | ... |

Fig. 10C

NOTICE 580

| Notice Identifier | Event-type Identifier | Parameter Data | |
|---|---|---|---|
| N001001 | E10 | PNPARM=XY123 | ... |
| N001002 | E20 | PNPARM=XY123 | ... |
| | | | ... |

Fig. 11A

DTQ 575

| Scheduled Time | Task-type Identifier | Notice Identifier | Executable Response |
|---|---|---|---|
| 511200 | T12 | N001001 | *PRG: execute forecasting program for this part* |
| ... | ... | ... | ... |

Fig. 11B

| Notice Identifier | Expression | Expression Value | ... |
|---|---|---|---|
| N001001 1212 | 9<10 1214 | TRUE 1216 | ... |

E10 959 → 570
Event-type Identifier: E10 1210

Fig. 12A

| Notice Identifier | Executable Response | ... |
|---|---|---|
| N001001 1222 | SQL: Insert requisition record; 1226<br>SQL: Insert E20 notice record 1228 | 1224 ... |

T11 939 → 937
Task-type Identifier: T11 1220

| Task-type Identifier | Notice Identifier | Executable Response | ... |
|---|---|---|---|
| T12 — 1240 | N001001 — 1242 | PRG: execute forecasting program for this part — 1244 | ... |
| 943 | | 1243 | |

| Task-type Identifier | Notice Identifier | Executable Response | ... |
|---|---|---|---|
| 1260 | 1262 | 1266 | ... |
| 959 | | | |

INV (Inventory Table) — 947

| Part Number | Buyer Code | Quantity-on-hand | Minimum-Quantity | Reorder-Quantity |
|---|---|---|---|---|
| XY123 — 1310 | ABC — 1312 | 9 — 1314 | 10 — 1316 | 36 — 1318 |
| ... | ... | ... | ... | ... |

REQN (Purchase Requisition Table) — 951

| Part Number | Quantity | Requestor |
|---|---|---|
| XY123 — 1320 | 36 — 1322 | PMKB — 1324 |
| ... | ... | ... |

DELTA MODEL PROCESSING LOGIC REPRESENTATION AND EXECUTION SYSTEM

CROSS-REFERENCE TO RELATED APPLICATIONS

This application claims the benefit of U.S. Provisional Application No. 60/019,572, filed Jun. 11, 1996 and U.S. Provisional Application No. 60/030,349, filed Nov. 6, 1996 and U.S. Provisional Application No. 60/033,008, filed Dec. 16, 1996 and U.S. Provisional Application No. 60/034,206 filed Jan. 21, 1997 and U.S. Provisional Application No. 60/036,702 filed Jan. 31, 1997.

FIELD OF INVENTION

The invention relates generally to computer-based process execution systems, and more particularly, to the optimized representation of processing logic.

DESCRIPTION OF THE RELATED ART

In the earliest days of electronic data processing, jumper wires on plugboards contained the definition of the process a machine was supposed to execute. Humans could not easily read this processing logic contained on the plugboards, and that processing logic represented only a very small and very low-level portion of the rules used to conduct a business enterprise. For example, the entire processing logic contained on a plugboard may have said little more than that numeric values contained in punched cards read by the machine should be summed, but only for those cards having an "X" in the first column of the card.

As tabulating machinery gave way to general purpose, stored-program computers, the processing logic moved from plugboards to application programs. The application programs had both machine-readable and human-readable forms. Making the processing logic easily accessible to people, as well as to the computer, was a major advantage over the plugboard—responsible people need to continually create, identify, understand, and maintain the processing logic, and the computer needs to continually execute it.

Processing logic in an application program generally comprises both the functional data manipulations for the computer to perform and the conditions under which those manipulations should be performed. For example, the processing logic may state that under the condition a payment is being made late, then the amount of the payment should be calculated at 103% times the invoiced amount, otherwise the amount of the payment should be calculated at 100% times the invoiced amount.

The ability to evaluate a condition and then determine which, if any, course of action to take dependent on the outcome is known as conditional branching. The computer's ability to perform conditional branching is a key to its widespread success and its application to problems diverse in nature and complexity. Computer programming languages, e.g., FORTRAN, COBOL, BASIC, and C, provide a variety of means to achieve conditional branching and the sophistication of a programming language may be judged on the conditional branching alternatives it provides. For example, the C language provides IF . . . THEN, SWITCH . . . CASE, FOR . . . NEXT, and other statement constructs for achieving conditional branching. Newer languages, such as C++, are not designed to simplify conditional branching but may include features to further facilitate or refine conditional branching mechanisms. Examples include the private and protected methods of classes in C++ that may restrict the courses of action targeted by a conditional branch.

Regardless of the conditional branching construct used, the purpose is to associate a condition with a course of action. These associations fundamentally represent the processing logic embodied by the application program. Unfortunately, the many possible constructs available for representing these condition-to-action associations obscures their underlying similarity.

The lack of similarity in the representations of the processing logic in traditional programming languages makes it difficult to collect and analyze the processing logic as a whole. For example, a business enterprise may have its manufacturing software, contained in hundreds of individual program modules, written in C, BASIC, and FORTRAN. The same business enterprise may have its accounting software, also containing hundreds of modules, written in COBOL and BASIC. Moreover, the manufacturing software may reside and execute on machines and operating systems from one vendor, while the accounting software resides and executes on machines and operating systems from another vendor. Furthermore, the BASIC language used for accounting programs may be a different variant than the BASIC language used for manufacturing program. Considering the dissimilar languages employed, the dissimilar ways to represent condition-to-action associations within each language, the dissimilar locations where the application programs may reside, and the dissimilar operating systems and hardware, it would be very difficult to programmatically collect and analyze the processing logic contained in all of the manufacturing and accounting application programs together. The same may be true within either of the manufacturing software or accounting software systems, by itself.

So, in a collective sense, the processing logic of the business cannot be readily collected and analyzed with the aid of the computer, despite the fact that the processing logic embodied in application programs is machine-readable. Such analysis of the collective processing logic is highly desirable for performing business modeling and for identifying contradictions, conflicts, and relationships among individual elements of processing logic. Business modeling involves the symbolic representation of the objects, entities, and processes involved in the operation of the business for planning, analysis, modification, simulation, and reporting.

The lack of similarity in the representations of the processing logic in conventional programming languages also has disadvantages despite its being human-readable. At the core of the problem is that fact that the business people responsible for determining the processing logic for the operation of the business enterprise, e.g., supervisors, managers, and directors (managers, or management), generally do not have the technical training required to understand and use computer programming languages. Consequently, management relies on intermediaries, i.e., computer programmers, to translate its intentions into a programming language that the computer understands. For example, if an appropriate company manager decides that a new class of employee needs to be created that earns benefits according to a different set of criteria than other existing classes of employees, then the manager must relate the new criteria to a programmer who modifies an application program or programs accordingly. Besides the inherent delay, this brings with it the possibility that "something gets lost in the translation." Disconnects frequently result between the business model intended by the management and the business model embodied in the processing logic in the application programs.

One potential solution to the above problems may be to develop software tools allowing management to directly manipulate the application programs written in traditional programming languages. Such a tool could provide an interface that translates between the traditional programming language and some intermediate level of representation more easily understood by managers. Again, because of the diversity of programming languages, a generalized tool would be difficult to develop and any such tool would likely be restricted as a practical matter to particular programming languages, hardware, and operating systems.

Another potential solution to the above problems appears to be standardization on a single computing language within the business enterprise. First, this may not be practical because of a need to use multiple computing platforms, some of which may be incapable of supporting the standard language. Further, the business enterprise may purchase some of its applications from software vendors and have no control over the language in which it is written. Even if standardization is possible, representation of the condition-to-action associations may be dissimilar within the language, e.g., IF . . . THEN vs. SWITCH . . . CASE; and managers are unlikely to have or obtain the technical training required to understand and use the language.

Furthermore, traditional computer languages are targeted for representing only the detailed levels of business processing logic, e.g., the calculation of a particular value to be printed on a particular line of an invoice. The management, however, also generally works with business processing logic at higher levels of abstraction, e.g., the billing of customers with outstanding balances. The high-level abstraction of business processing logic, although integrally related to the detailed levels, is not typically embodied in the application programs of the business enterprise at all. Instead it may be embodied in written or unwritten manual procedures, or in automated scheduling or workflow systems. The automated scheduling and workflow systems may support the storage of rudimentary processing logic in machine-readable form, albeit typically in some proprietary fashion tailored to the specific abilities of the system.

Consequently, there is a need in the art for method, apparatus, and structure for simply and uniformly representing processing logic in terms of its condition-to-action associations, readily susceptible to direct manipulation by persons with limited technical training, and able to simultaneously represent processing logic at multiple levels of detail and abstraction. Such method, apparatus, and structure would have the further advantages of ease of portability and interoperability between and among various makes, models, and versions of computer hardware and operating systems; susceptibility to automated analysis; and support for incremental implementation. Such method, apparatus, and structure would not be limited to applications of business processing, but may be advantageously employed wherever computer-based representation of processing logic is desired. The present invention meets these needs.

SUMMARY OF THE INVENTION

The present invention involves method, apparatus, and data structures for representing and executing processing logic using a computer system. The processing logic may be as complex, for example, as the combined practices, procedures, and policies used to run an entire business enterprise, or, as simple, for example, as the process performed by a single machine using an embedded computer.

In the practice of the invention, the processing logic of a subject process is reduced to novel data structures containing its definition. A first data structure stores expressions for evaluating various aspects of the state of the subject process. The expression is a series of symbols that can be evaluated to have a particular value and represents a condition placed on subsequent processing. A second data structure stores information representing correspondences between expression results and tasks to perform. A third data structure stores task definitions. Tasks represent executable responses, i.e., a predefined set of one or more instructions that may be performed using a computer, e.g., a computer program module.

During the operation of the subject process, events occur that are signaled using the computer system. For example, in a manufacturing process, a machine jam may be a type of event that occurs. The particular type of the occurring event, the event-type, is used to identify an expression in the first data structure. The event-type is implicitly or explicitly contained in the input signal. Evaluation of the identified expression produces a resulting value, which together with the event-type, may identify one or more correspondences stored in the second data structure. The identified correspondence information is then used to identify task definitions stored in the third data structure. Execution of identified tasks is then initiated.

In other words, the expressions represent conditions placed on the execution of executable responses, the task definitions define a pool of executable responses, and the correspondences relate the conditions to particular executable responses. By separating the expressions from the executable responses, and relating them via the correspondences data structure entries, the processing logic may be easily reconfigured and existing definitions reused.

In a preferred embodiment, the data structures are maintained as relational tables. The expressions in the first data structure conform to a system of multi-valued predicate logic after the fashion discussed in E. F. Codd, The Relational Model for Database Management, Version 2 (Addison-Wesley 1990). Evaluation of an expression results in a "truth" value, e.g., true or false. In this preferred embodiment, only "true" results produce downstream activity (i.e., only an evaluation of an expression that produces a "true" result has task correspondence entries in the second data structure).

These and other objects, advantages, and features of the present invention will become apparent from the following detailed description when taken in conjunction with the accompanying figures.

BRIEF DESCRIPTION OF THE DRAWINGS

FIGS. 6A to 6D depict record layouts encoded in a memory medium for PMKBS catalog entries.

FIGS. 7A to 7D depict record layouts encoded in a memory medium for PMKBS operating data structure entries.

FIGS. 10A to 10C depict abbreviated sample contents of PMKBS catalog tables encoded in a memory medium for purposes of illustration.

FIGS. 11A to 11B depict abbreviated sample contents of PMKBS process-independent data tables encoded in a memory medium useful for purposes of illustration.

FIGS. 12A to 12D depict abbreviated sample contents of PMKBS process-dependent data tables encoded in a memory medium useful for purposes of illustration.

FIGS. 13A to 13B depict sample contents of hypothetical data tables encoded in a memory medium as may be employed in an inventory management application of a manufacturing business.

DETAILED DESCRIPTION OF THE PREFERRED EMBODIMENT

The present invention comprises novel method, apparatus, and data structures for representing and executing processing logic. The following description is presented to enable any person skilled in the art to make and use the invention, and is provided in the context of particular applications and their requirements. Various modifications to the preferred embodiment will be readily apparent to those skilled in the art, and the generic principles defined herein may be applied to other embodiments and applications without departing from the spirit and scope of the invention. Thus, the present invention is not intended to be limited to the embodiment shown, but is to be accorded the widest scope consistent with the principles and features disclosed herein.

PMKBS Structural Overview

Figure 1:
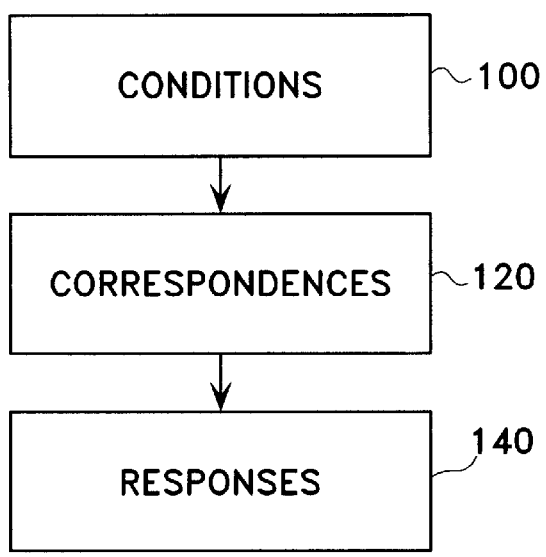
FIG. 1 depicts a block diagram of processing logic element stores encoded in a memory medium.

FIG. 1 depicts a block diagram of data stores for processing logic elements encoded in a memory medium in one embodiment. Processing logic elements comprise individual memory-encoded representation of conditions, associations, and courses of action. Data stores for processing logic elements include a conditions data store 100, a correspondences data store 120, and a responses data store 140.

The processing logic in an embodiment practicing the present invention is defined in terms of conditions associated with courses of action. Unlike traditional programming languages, however, an embodiment practicing the present invention stores the conditions, associations, and courses-of-action elements of the processing logic as distinctly addressable data items. Nevertheless, the elements are linked in an overal structure. Conditions are stored in the conditions data store 100, associations are stored in the correspondences data store 120, and courses of action are stored in the responses data store 140.

Storage of processing logic elements in this fashion, and utilizing the associations as an intermediate link between conditions and responses, permits an embodiment to easily allow multiple use and reuse of individual processing logic elements. For example, a course of action that is executed under many conditions can be defined once and be referenced by as many associations as necessary. This represents a further advantage of the present invention.

Figure 2:
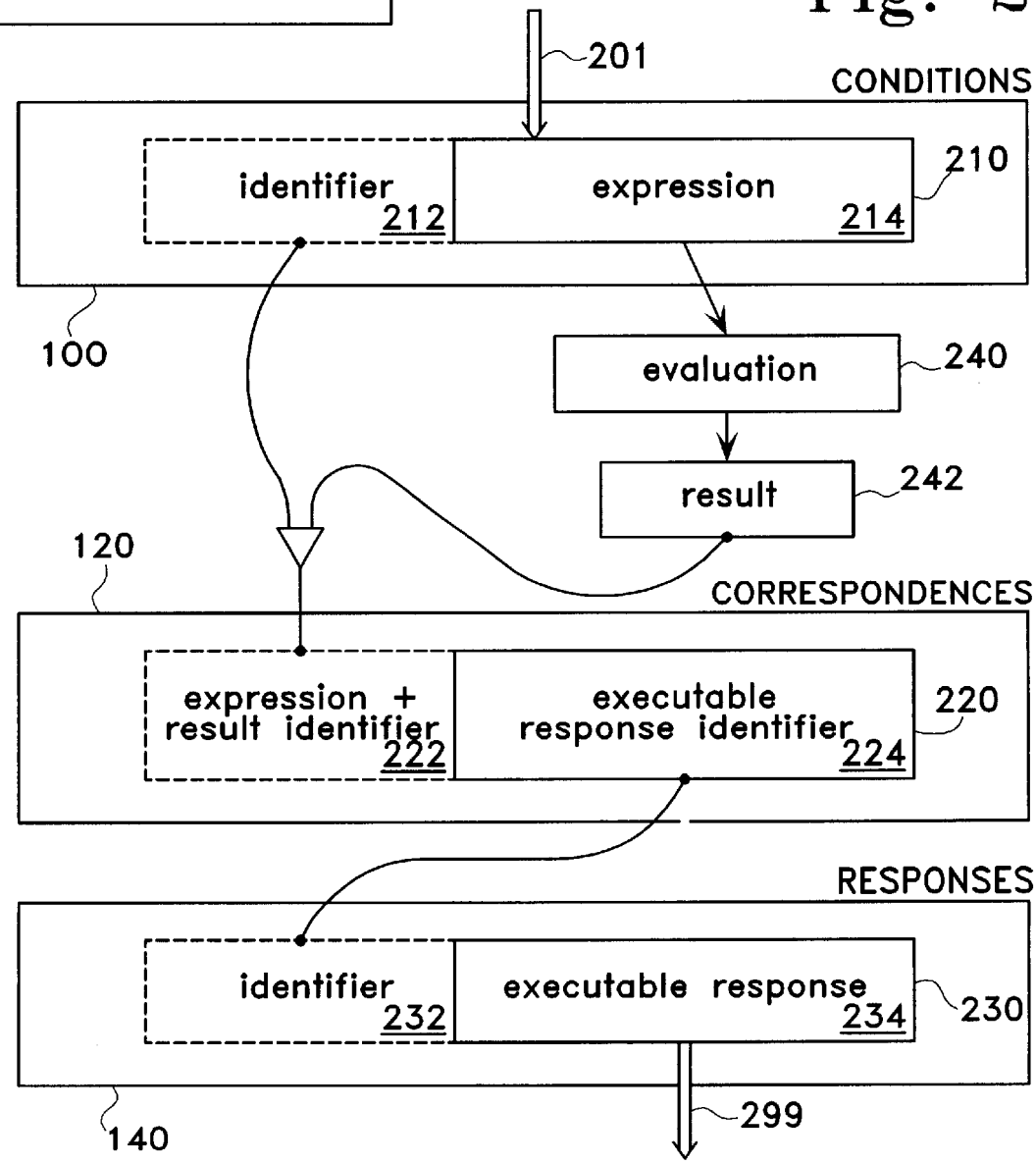
FIG. 2 depicts processing logic element stores with representative entry data structures.

FIG. 2 depicts processing logic element stores with representative entry data structures. The conditions data store 100 in one embodiment contains one or more entries. The purpose of each entry 210 is to represent a condition to be satisfied if a certain course of action is to be taken. Each entry 210 comprises an expression field 214. The expression field 214 may store an expression, itself, or a reference to another storage location where an expression can be found in a memory medium.

Each expression is a series of information that can be evaluated to have a particular value. Achieving a certain particular value can then be the condition on which taking a subsequent course of action is based. An expression generally tests the state or states of one or more data items that represent elements related to a subject process. The data items to be evaluated may be contained in or determined by an input signal 201. For example, an expression may test the state, e.g., value, of a numeric data item that represents the quantity of a particular part in the stockroom for an inventory process. This construction permits the linkages of different correspondences 220 to be utilized depending on the result of expression evaluation 242. That is, the link between the condition store, and the correspondence store is determined (a resolved) based upon the result of the evaluation of the expression.

Each entry 210 in the conditions data store 100 may further comprise an identifier 212. The identifier 212 serves to uniquely identify the entry 210, i.e., the expression 214, from among any others in the conditions data store 100. The identifier 212 may be implicit or explicit. For example, the memory address where the entry is stored in a memory medium may be used as the implicit and unique identifier. Alternatively, the identifier 212 may be a field in the entry 210 that stores a value, e.g., a string of characters like "ABC123", which value is used to explicitly and uniquely identify the related expression field 214.

The responses data store 140 in one embodiment contains one or more entries that are associated with each other in the memory medium. Each entry 230 comprises an executable response field 234. The executable response field 234 may store an executable response, itself, or a reference to another storage location where an executable response can be found in a memory medium.

An executable response comprises a predefined set of instructions that may be performed using a computer. For example, an executable response may be a program, a program name, a program address, or a statement susceptible to execution by the operating system or a subsystem. As a specific example, an executable response may be a command line recognizable by the operating system that causes execution of a program that forecasts the usage rate and inventory level for a particular part.

Each entry 230 in the responses data store 140 may further comprise an identifier 232. The identifier 232 serves to uniquely identify the entry 230, i.e., the executable response 234, from among any others in the responses data store 140. The identifier 232 may be implicit or explicit. For example, the memory address where the entry is stored in a memory medium may be used as the implicit and unique identifier. Alternatively, the identifier 232 may be a field in the entry 230 that stores a value, e.g., a string of characters like "XYZ789", which value is used to explicitly and uniquely identify the related executable response field.

The correspondences data store 120 in one embodiment contains one or more entries. The role of each entry 220 is to link a condition to a course of action. Implementing those linkages as distinctly addressable processing logic elements facilitates reusability and reconfiguration which are farther advantages of the present invention. Each entry 220 comprises a field 224 containing an identifier for a particular entry in the responses data store 140, i.e., a course of action. Each entry 220 further comprises an identifier 222 corresponding to a particular combination of an expression 214 in the conditions data store 210 and a particular value that may result from an evaluation of the expression 242, i.e., a condition. This identifier 222 may be implicit or explicit. For example, the memory address where the entry is stored in a memory medium may be calculable using the conditions data store entry identifier 212 and the value resulting from evaluation of the expression 242. Alternatively, the identifier 222 may be a field or fields in the entry 220 that stores a value, e.g., a string of characters like "ABC123/TRUE."

As an example, a correspondence entry 220 may be identified by a less-than-ten value resulting from the evaluation of an expression that tests the state of a numeric data item that represents the quantity of a particular part in the stockroom for an inventory process, which expression is contained in a particular entry in the conditions data store. The same correspondence entry 220 may contain an identifier 224 for a responses table entry containing an executable response that is a command line recognizable by the operating system that causes execution of a program that forecasts the usage rate and inventory level for a particular part.

Using the examples described above, if during operation an input signal associated with the example entry in the conditions data store 100 prompts evaluation of the expression 214 contained therein, and the evaluation produces a less-than-ten resulting value 242, the resulting value 242 leads to the example entry in the correspondence data store 120 which, in turn, leads to the example entry in the responses data store 140, causing initiation of the program that forecasts usage and inventory level for the part.

The conditions 100, correspondences 120, and responses 140 data stores may together be referred to as a process management knowledgebase (PMKB) catalog. A system utilizing the processing logic represented in the PMKB catalog to facilitate execution of a subject process may be referred to as a process management knowledgebase system (PMKBS).

Figure 3:
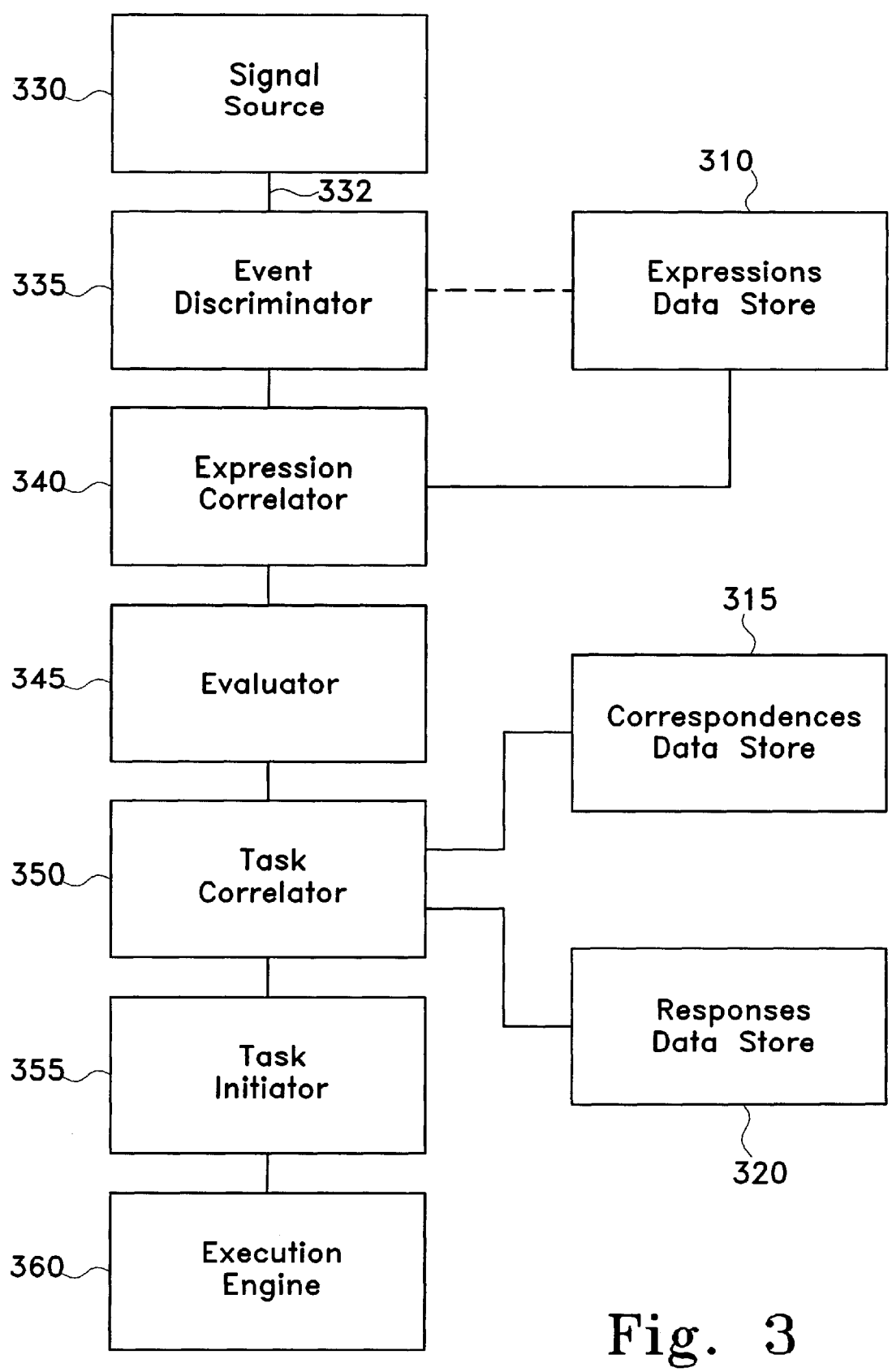
FIG. 3 depicts a functional block diagram of a Process Management Knowledgebase System (PMKBS) encoded in a memory medium.

FIG. 3 depicts a functional block diagram of a Process Management Knowledgebase system encoded in a memory medium. The system comprises a signal source 330, an event discriminator 335, and expression correlator 340, an evaluator 345, a task correlator 350, a task initiator 355, an execution engine 360, an expressions data store 310, a correspondences data store 315, and a responses data store 320.

The Process Management Knowledgebase system is a data processing system for controlling and monitoring the execution of a subject process where the processing logic is defined in a process management knowledgebase. The PMKB comprises the expressions data store 310, the correspondences data store 315, and the responses data store 320. The expressions 310, correspondences 315 and responses 320 data stores correspond to the conditions 100, correspondences 120, and responses 140 data stores of FIG. 1, respectively.

The expressions data store 310 in this embodiment contains event-type identifiers and related expressions. An event-type identifier corresponds to the identifier 212 in the conditions data store 100 depicted in FIG. 2. It is called an event-type identifier because, in the present embodiment, a particular type of event that occurs in a subject process may have a corresponding entry in the expressions data store.

The related expressions are used to evaluate aspects of the state of the subject process that is being controlled and monitored by the PMKBS. Evaluation of the related expression generally occurs upon the occurrence of some event in the subject process signaled to the PMKBS.

The response data store 320 in this embodiment contains task-type identifiers and related responses. A task-type identifier corresponds to the identifier 232 in the responses data store 140 depicted in FIG. 2. The related responses in this embodiment are unordered sets of programmed instruction sequences that may be executed on a computing system using, for example, the operating system, a subsystem, a utility or application program, specialized hardware or a subcomponent of the PMKBS, itself.

The correspondences data store 315 contains representations for associating the result of the evaluation of an expression from the expression data store 310 with a response from the response data store 320. In one embodiment, an event-type identifier, alone, represents both the particular expression and the particular result, because in that embodiment, only a result of "TRUE" is permitted to have an associated response. The result value of "TRUE" is thus implied in every entry of the correspondences data store 315 and does not need explicit representation. A task-type identifier represents the response.

The signal source 330 actively or passively collects input signals containing information about events occurring in the process external to the PMKBS. For example, the signal source 330 may actively collect input signals by periodically scanning a database for specific types of changes. As an alternative example, the signal source 330 may passively collect input signals by providing an entry point in its programming code that programs external to the PMKBS can call to signal the PMKBS.

The event discriminator 335 analyzes information in and about the input signal 332 to identify it with an event-type represented in the expression data store 310. The expression correlator 340 uses the identified event-type to locate a corresponding expression in the expression data store 310. The expression correlator 340 may then process the stored expression, transforming it from a general form to a specific form, for example, by performing variable substitution. For instance, the stored expression may be of a general form saying "check the inventory quantity of a part" while the specific form may say "check the inventory quantity of part number Y123." Alternatively, this transformation could be performed by the evaluator 345.

The evaluator 345 analyzes the expression from the expression correlator 340 and resolves it to a resulting value. The task correlator 350 uses the resulting value to locate corresponding task-type identifiers in the correspondences data store 315. The task correlator 350 uses the identified task-types to locate corresponding responses in the responses data store 320. The task initiator 355 then takes the identified responses and submits them, after any preprocessing, to an execution engine 360. Preprocessing may involve, for example, the substitution of variables. The execution engine 360 then executes the responses that have been submitted to it.

Hardware Architecture

Figure 4:
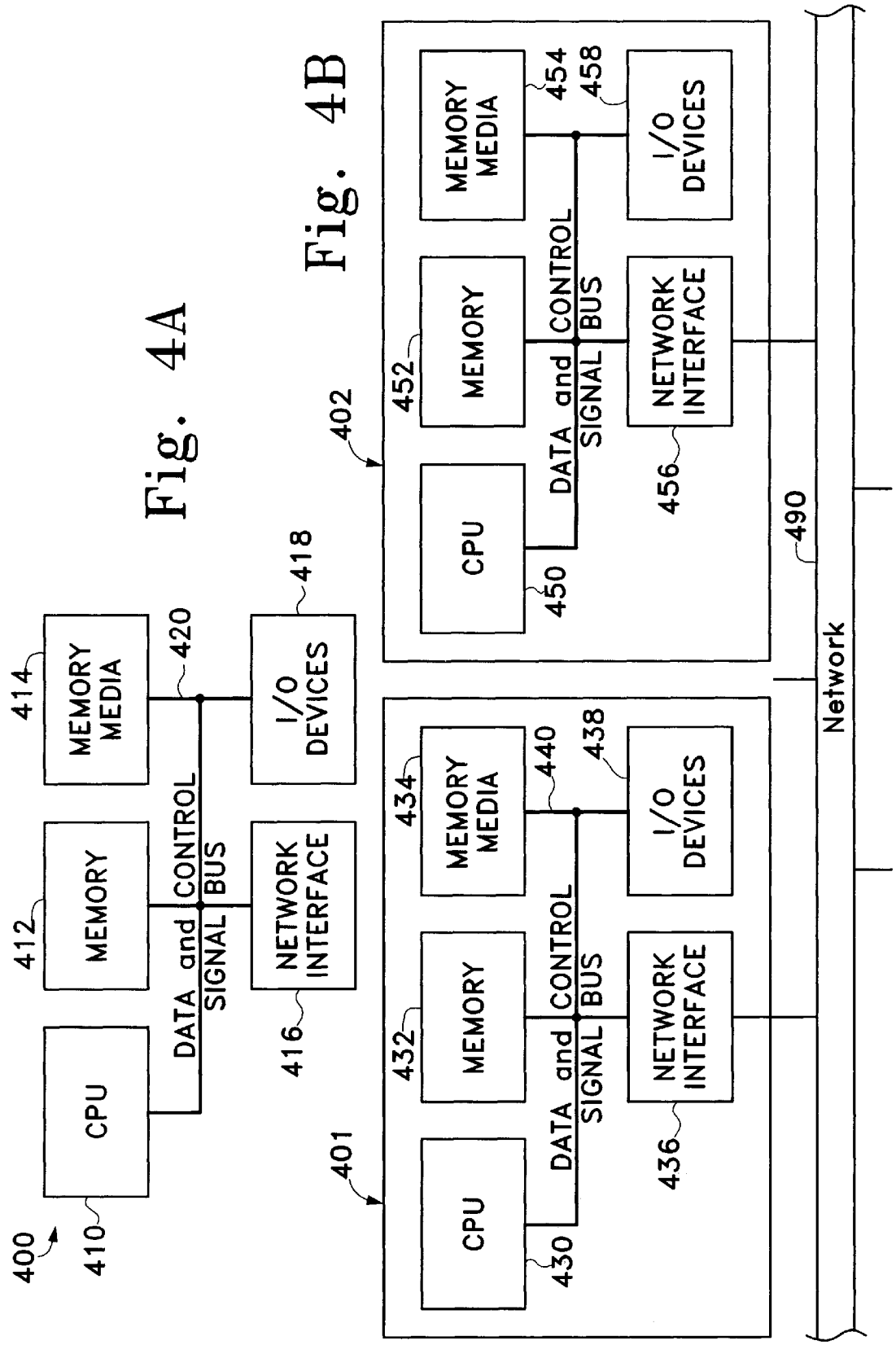
FIGS. 4A and 4B depict representative computer hardware environments that may be used to implement a PMKBS.

FIG. 4A and 4B depict representative computer hardware environments that may be used to implement a PMKBS. FIG. 4A depicts a single computer system 400 comprising a CPU 410, memory 412, memory media 414, network interface 416, and input/output devices 418 all connected via a data and control signal bus 420. Such a computer configuration is widely known in the art. The CPU 410 executes instructions using instructions and data stored in the memory 412 and accessed by the CPU 410 using the signal bus 420. Memory 412 may comprise combinations of RAM and ROM. The CPU 410 in a multiprocessing or parallel processing computer system may comprise multiple individual CPU's, and likewise its memory 412 may comprise multiple sections, each accessible or inaccessible to some combination of the individual CPU's.

Instructions and data may transfer between the CPU 410 or memory 412, and the memory media 414, network interface 416, and I/O devices 418 using the signal bus 420. Memory media 414 may comprise devices employing, e.g., magnetic, optical, magneto-optical, or other recording techniques for reading and/or writing to tape, disk, cartridge or other media. I/O devices 418 may comprise keyboards, pointing devices, video displays, printers, speakers, scanners, cameras, accelerator cards, supplemental processor cards, or other peripherals through which a user may interface with the computer system or which may extend the processing functionality of the computer system. The network interface 416 may comprise, e.g., network interface cards or modems which permit the computer 400 to establish data communication with other computer systems.

FIG. 4B depicts multiple individual computer systems 401, 402, like the one 400 illustrated in FIG. 4A, coupled by an electronic data communications network 490. The network 490 allows the individual computer systems 401, 402 to exchange data. Further, software on the individual computer systems 401, 402 may employ exchanged data to represent service requests and responses, allowing the individual computers 401, 402 to cooperate in the processing of a workload. Such cooperative processing is well known in the art and may take many forms, e.g., peer-to-peer, client-server, multi-tiered, parallel-processing architecture, and combinations.

Defining Processing Logic

Figure 5:
FIG. 5 depicts one method of defining processing logic to the process management knowledgebase (PMKB).
Figure 5A:
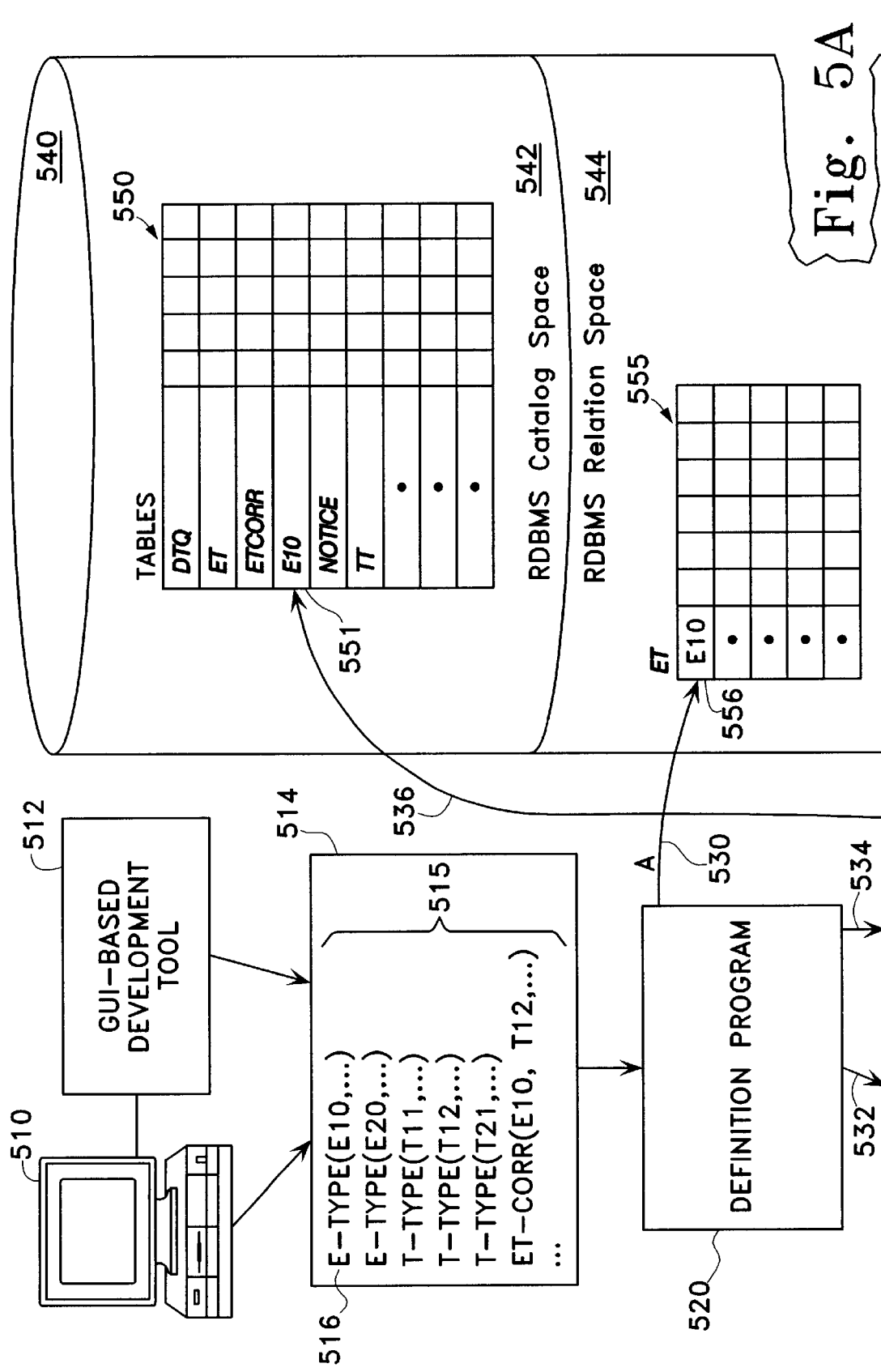
Figure 5B:
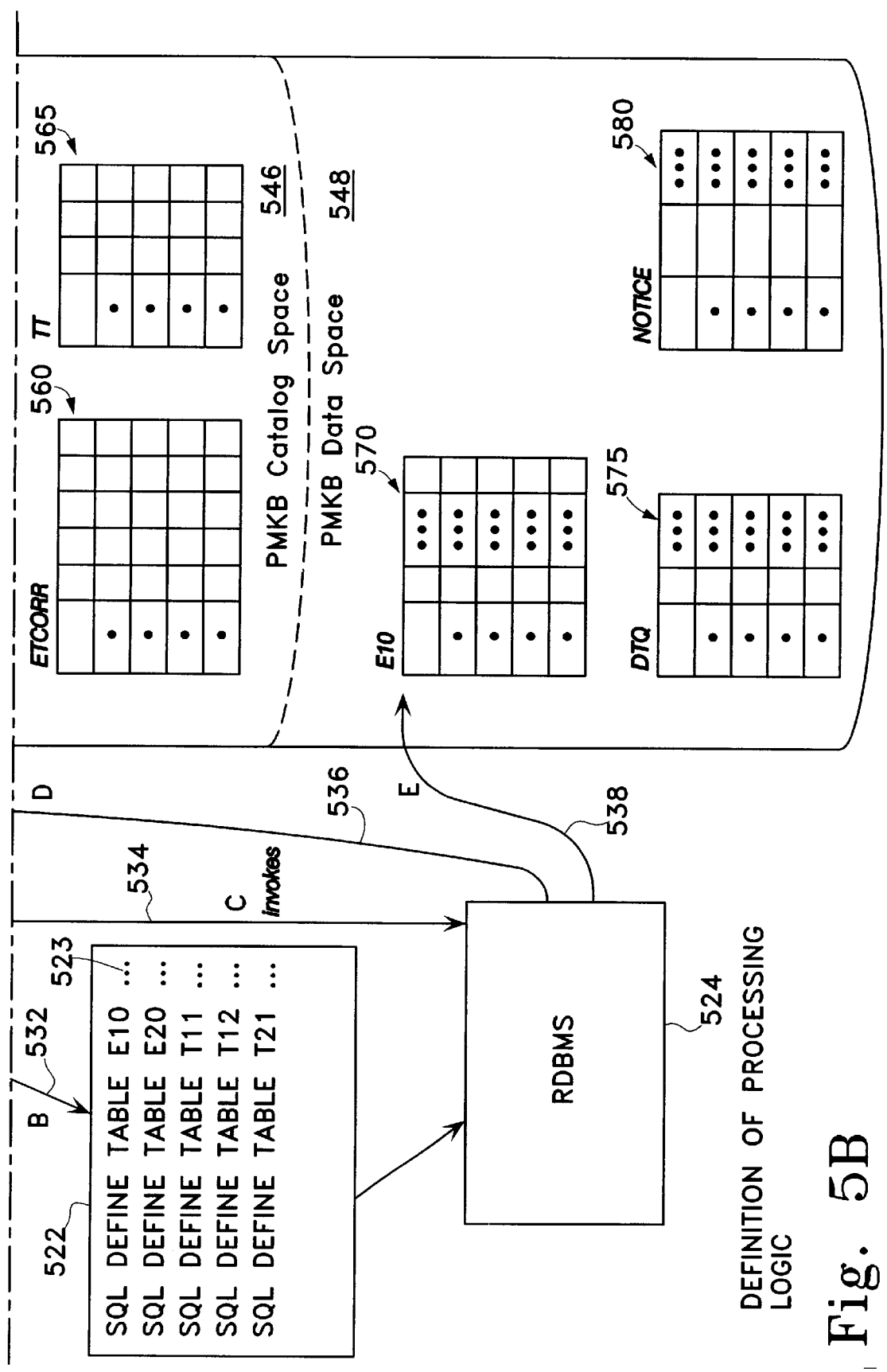

For the PMKBS to control and monitor a subject process, the processing logic, of that process must first be encoded in memory medium in a form the PMKBS accepts. FIG. 5 depicts one method of defining processing logic into a process management knowledgebase (PMKB). In one embodiment, the PMKB is maintained using the services of a relational database management system (RDBMS). RDBMS's are widely known in the art. Many RDBMS products are available commercially. An advanced RDBMS product may contain many or all of the features described in E. F. Codd, The Relational Model for Database Management, Version 2 (Addison-Wesley 1990) and hereby incorporated by reference. Advanced features that may be employed to implement the presently described embodiment of the invention include, e.g., field-level triggering and access to a predicate logic expression evaluator via an RDBMS language.

In the embodiment depicted in FIG. 5, conventional RDBMS software on the computer manages relations, or tables, designated TABLES 550, ET 555, TT 565, ETCORR 560, DTQ 575, NOTICE 580, and E10 570, on a memory media device 540. The TABLES table 550 is shown for illustrative purposes and represents an exemplary RDBMS conventional catalog structure. For purposes of illustration, the TABLES table 550 contains one record, or row, for each table managed by the RDBMS.

The Event-Type (ET) 555, Task-Type (TT) 565, and Event-to-Task Correspondence (ETCORR) 560 tables are part of a PMKBS catalog 546. Relating back to FIG. 3, the ET table 555 acts as the expression data store 310, the TT table 565 acts as the response data store 320; and the ETCORR table 560 acts as the correspondences data store 315. These tables 555, 560, 565 are defined to the RDBMS as part of the installation process for the PMKBS.

In the present embodiment, a computer user interfaces to the computer using a keyboard, monitor, and possibly a mouse 510. The computer user creates a file of statements 514. The statements in the file 515 codify elements of the processing logic of the subject process being defined to the PMKBS. Each statement defines a row to be inserted in one of the ET 555, TT 565, or ETCORR 560 tables. The file of statements 514 may be created directly by the user through the use of a text-editing program or a word processor. Alternatively, the computer user may employ a front-end utility program 512, such as a GUI-based development tool, that produces the file of statements 516 in response to user inputs.

The completed file of statements 514 is an input to a definition program 520. The definition program 520, in some embodiment, may be a software program of the PMKBS. The definition program 520 reads each statement from the input file 514 and inserts a row into the PMKBS catalog 546 table to which the statement pertains. In this embodiment, the definition program 520 creates additional tables in the PMKB. The additional tables are used to record activity during operation of the subject process under the PMKBS. To create the additional tables, the definition program 520 creates SQL statements 522. The definition program 520 then invokes the RDBMS 524, passing the SQL statements 522. In response to the SQL statements 522, the RDBMS 524 establishes the new tables.

An example of the defining process depicted in FIG. 5 assumes the computer user wants to define a new event-type, E10. Using an editor or GUI-based development tool, the user creates a statement defining the event-type 516. The definition program 520 reads the statement and parses it to determine that it defines an event-type. Relevant information is extracted from the statement and inserted into a new row in the ET table 555 as indicated by arrow A 530. The definition program 520 also creates an SQL statement 523 compatible with the SQL language provided by the RDBMS 524, as indicated by arrow B 532, to define a new table to hold instances of the E10 event-type that occur during operation of the process. The definition program 520 invokes the RDBMS 524 as indicated by arrow C 534, passing the SQL statement 523 to it. The RDBMS 524 makes an entry 551 for the E10 table in its catalog 542 as indicated by arrow D 536, and creates an empty table 570 to hold E10 records as indicated by arrow E 538.

The operation of the definition program 520 is described above in terms of a batch/compiler mode of operation. One skilled in the art recognizes that other alternatives to populating the PMKBS catalog may be employed, e.g., interpreters, or transaction processors, without departing from the spirit of the invention. For example, a graphical user interface, such as the one contained in Microsoft ACCESS, may give a user fast and easy access to directly manipulate the data in the PMKBS catalog 546 tables.

PMKBS Catalog Data Structures

FIGS. 6A to 6D depict record layouts for PMKBS catalog 546 entries. FIG. 6A depicts the record layout for an event-type definition record 660 contained in the ET table 555. The record 600 comprises event-type identifier 601, time stamp 603, expression template 605, active time 607, end time 609, and source identifier 611 fields. The primary key 619 of the record 600 comprises the event-type identifier 601 plus the time stamp 603 fields. The combined contents of the fields in a primary key uniquely identify a particular record in a table, and may serve to define a default order in which records appear or are processed. The event-type identifier field 601 contains a unique name for a type of event that can occur in a subject process. The time stamp field 603 contains a representation of the date and time at which the record 600 is inserted into the table.

The expression template field 605 contains a template for an expression to be evaluated to determine some aspect of the state of the subject process when an event of event-type occurs during operation of the subject process. In the present embodiment, the expression template is a predicate logic expression conforming to a syntax supporting predicate logic. Predicate logic is known in the art and is discussed in references such as Donald Gillies, Artificial Intelligence and Scientific Method (Oxford University Press 1996), and Alonzo Church, Predicate Logic (Princeton). The expression template may contain names of variables that are substituted prior to evaluation. Variables used in the expression template in this embodiment may refer to any data item addressable using the RDBMS.

It is noted here that the ability to reference any data item addressable using the RDBMS gives the PMKBS extensive reach for the processes it manages when used in conjunction with a distributed RDBMS. If, for example, a company's distributed RDBMS connects companies nationwide, the PMKBS could make decisions, i.e., check conditions, based on factors not just in a local office, but around the nation.

The active time field 607 contains the earliest date and time that the event definition is to be considered active and valid during operation of the PMKBS. The end time field 609 contains the earliest date and time, after the time of its initial activation, that the event definition is to be considered inactive. The source identifier field 611 contains the identity of the computer user or system responsible for creating the instant event-type definition.

The inclusion of the active time 607 and end time 609 fields allows alternative definitions for event-types to be staged in anticipation of a planned change of the process model. Such fields may be similarly implemented with the other record types for tables in the PMKBS catalog. Implementing such fields provides flexibility in the PMKBS for use with relatively dynamic process models.

FIG. 6B depicts the record layout 620 for a task-type definition record contained in the TT table 565. The record 620 comprises task-type identifier 621, executable response template 623, and source identifier 625 fields. The primary key 639 comprises the task-type identifier field 621. The task-type identifier field 621 contains a unique name for an executable response.

The executable response template field 623 contains a set of command statements. In the present embodiment, a command statement is either a statement containing an SQL statement to be executed by the RDBMS, or a statement containing a program name and parameters to be executed by the operating system shell. The format of the statements in the preferred embodiment appears in Table 1. The "SQL:" statement permits processing of data maintained by the RDBMS via a language provided by the RDBMS. The "PRG:" statement permits execution of a named program recognized by the operating system. As such, the PMKBS can initiate virtually any type of processing supported by the operating system and subsystems, so long as a program has been created to perform the desired processing.

TABLE 1

Executable Response Statement Formats
(Items appearing in brackets are optional)

| | |
|---|---|
| SQL: | sql-statement |
| PRG: | [pathname]program-name [program-parameter-string] |

In the presently described embodiment, the executable response template associated with a task-type contains an unordered set of command statements. Furthermore, there is no provision for branching between and among the individual commands in the set. As such, the computer user can make no assumption about the order in which the work units are actually executed in any particular instance. The unordered and unbranched nature of the set renders the representation of the process model in the PMKBS catalog more susceptible to automated analysis because the analyzer does not have to identify and account for operational interdependencies between individual commands. The unordered and unbranched nature precludes such interdependencies. For the same reason, the unordered and unbranched nature also permits easy exploitation of parallel processing capabilities. These represent further advantages of the invention.

The source identifier field 625 contains the identity of the computer user or system responsible for creating the instant task-type definition.

FIG. 6C depicts the record layout for an event-to-task correspondence record 640 contained in the ETCORR 560 table. The record 640 comprises event-type identifier 641, task-type identifier 643, scheduled-time expression template 645, and source identifier fields 647. The primary key 659 comprises the event-type identifier 641 and task-type identifier 643 fields. The event-type identifier field 641 contains a unique name for a type of event that can occur in the subject process and matches the value stored in the event-type identifier field 601 of a record 600 in the ET table 555. The task-type identifier field 643 contains a unique name for an executable response and matches the value stored in the task-type identifier field 621 of a record 620 in the TT table 565.

The scheduled-time expression template field 645 contains an expression that may resolve in any particular instance to a date-time value. The resolved date-time value represents the earliest desired execution time for the executable response associated with the task-type. Inclusion of this field 645 in the present embodiment allows the PMKBS to feature deferred task execution, in addition to immediate task execution.

The source identifier field 647 contains the identity of the computer user or system responsible for creating the instant event-type definition.

FIG. 6D depicts an alternative embodiment 660 for an event-to-task correspondence record 640 that may be contained in an ETCORR table 560. The record layout 660 depicted in FIG. 6D differs from the record layout 640 depicted in FIG. 6C only by the addition of an expression value field 663 in the primary key area 679 of the record. Using the record layout 660 of FIG. 6D, the table is more appropriately entitled the event-result-to-task correspondence table. This reflects the possibility that in some embodiments, evaluation of the expression stemming from the expression template 605 in the event-type definition record 600 could produce more than one resulting value that should correlate to a task. For example, in an embodiment of a PMKBS an expression may be able to evaluate to a resulting value of 1, 2, or 3. If the resulting value is 1, then it is desired to perform a task-type that sends email; if type 2, a task-type that sends fax; and if type 3, a task-type that sends regular mail. Adding the expression value field 663 to the correspondence record 660 allows it to correlate particular resulting values for an event-type, to task-types, rather than just correlating event-types to task-types.

The reason that the preferred embodiment of the PMKBS uses the record layout 640 depicted in FIG. 6C that omits the expression value field is that the preferred embodiment only executes tasks when evaluation of an expression produces a value of "TRUE." A resulting expression value of "TRUE" is implied in every event-to-task correspondence and can thus be omitted. The preferred embodiment could employ the record layout 660 depicted in FIG. 6D that includes the expression value field 663, but the field would contain the value "TRUE" in every record. This would needlessly consume storage space and could slow down the processing of records by forcing the RDBMS to regularly consider the "TRUE" value in each record by virtue of its position in the primary key. In the preferred embodiment, the expression value is implied.

PMKBS Operating Data Structures

While the data structures in the PMKBS catalog 542 contain declarative information that generally define elements of the processing logic, data structures in the PMKBS operating data space 548 contain information that specifically reflect particular instances, or occurrences, arising during operation of the subject process. For this reason, individual records within the operating tables may be referred to, themselves, as instances or occurrences. Further, an instance or occurrence in an operating table may be derived from an archetype record in the PMKBS catalog. The derivation may involve, for example, variable substitution. In such a case, the process of derivation is called specialization and the record is said to be specialized.

FIGS. 7A to 7D depict record layouts for PMKBS operating data structure entries. FIG. 7A depicts the record layout for a Notice record 700 contained in the NOTICE table 580. In the presently described embodiment, the NOTICE table serves as the signal source for the PMKBS. The NOTICE record 700 comprises notice identifier 701, event-type identifier 703, parameter data 705, and time stamp 707 fields. The primary key 719 of the record 700 comprises the notice identifier field 701. The notice identifier field 701 contains a unique value with which to identify the particular row in the NOTICE table from among all others.

The event-type identifier field 703 contains a unique name for a type of event that can occur in the subject process and matches the value stored in the event-type identifier field 601 of a record 600 in the ET table 555. The parameter data field 705 may contain a list of data items that contextualize the event that incited the input signal represented by the NOTICE record 700 instance. For example, if a change in the number of a part in inventory is the type of event, then the parameter data 705 may provide context for the event by specifying the particular part number. In the present embodiment, the list of data items is in keyword-value format using the syntax depicted in Table T2. The time stamp field 707 contains a representation of the date and time at which the record 700 was inserted into the table 580.

Table T2. Parameter Data Format
(Items appearing in brackets are optional)
[keyword=value][keyword=value] . . .

FIG. 7B depicts the record layout for an event occurrence record 720. Records of this format may occur in multiple tables in the PMKBS operating data area 648 as, in this embodiment, there is one table per declared event-type for storing instance data. The purpose of the event-type occurrence records in the present embodiment is to maintain a log of PMKBS activity. The records may also be used to incite execution of portions of the PMKBS program code as discussed in more detail in relation to FIGS. 8A to 8D. The record 720 comprises event-type identifier 721, notice identifier 723, expression 725, expression value 727, and time stamp 729 fields. The primary key 739 of the record 720 comprises the event-type identifier 721 and notice identifier 723 fields. The event-type identifier field 721 contains a unique name for a type of event that can occur in the subject process and matches the value stored in the event-type identifier field 601 of a record 600 in the ET table 555. The notice identifier field 723 contains a unique value that identifies a particular row in the NOTICE table 580. The expression field 725 contains the specialized form of the expression template contained in the active record in the ET table having the matching event-type identifier with that of the instant record. The expression value field 727 may contain the resultant value from the evaluation of the specialized expression contained in the expression field 725. The time stamp field 729 contains a representation of the date and time at which the record 720 is inserted into a table.

FIG. 7C depicts the record layout for a task occurrence record 740. Records of this format may occur in multiple tables in the PMKBS operating data area as, in this embodiment, there is one table per declared task-type for storing instance data. The purpose of the task-type occurrence records in the present embodiment is to maintain a log of PMKBS activity. The record may also be used to incite execution of portions of the PMKBS program code as discussed in more detail in relation to FIGS. 8A to 8D.

The record comprises task-type identifier 741, notice identifier 743, executable response 745, and time stamp 747 fields. The primary key 759 of the record 740 comprises the task-type identifier 741 and notice identifier 743 fields. The task-type identifier field 741 contains a unique name for an executable response, and matches the value stored in the task-type identifier field 621 of a record 620 in the TT table 565. The notice identifier field 743 contains a unique value that identifies a particular record in the NOTICE table. The executable response field 745 contains the specialized form of the executable response model contained in the record in the TT table having the matching task-type identifier with that of the instant record. The time stamp field 747 contains a representation of the date and time at which the record was inserted into a table.

FIG. 7D depicts the record layout for a delayed task queue record 750 contained in the Delayed Task Queue (DTQ) table 575. The DTQ table 575 in this embodiment is used to implement deferred tasks. The purpose of the delayed task queue records 750 in the present embodiment is to maintain a log of PMKBS activity and to maintain a record of pending deferred execution requests. The records may also be used to incite execution of portions of the PMKBS program code as discussed in more detail in relation to FIGS. 8A to 8D. The record 750 comprises scheduled time 751, task-type identifier 753, notice identifier 755, and executable response 757 fields. The primary key 769 of the record 750 comprises the scheduled time field 751. The scheduled time field 751 contains a representation of the earliest date and time at which a deferred task is to be executed. The task-type identifier field 753 contains a unique name for an executable response to be deferred, and matches the value stored in the task-type identifier field 621 of a record 620 in the TT table 565. The notice identifier field 755 contains a unique value that identifies the particular row in the NOTICE table that gave rise to the instant DTQ record. The executable response field 757 contains the specialized form of the executable response model contained in the record in the TT, table having the matching task-type identifier with that of the instant record.

An operational example involving the use of the operating data structures illustrated in FIGS. 7A to 7D is described later in reference to FIG. 9.

PMKBS Operational Description

Figure 8A:
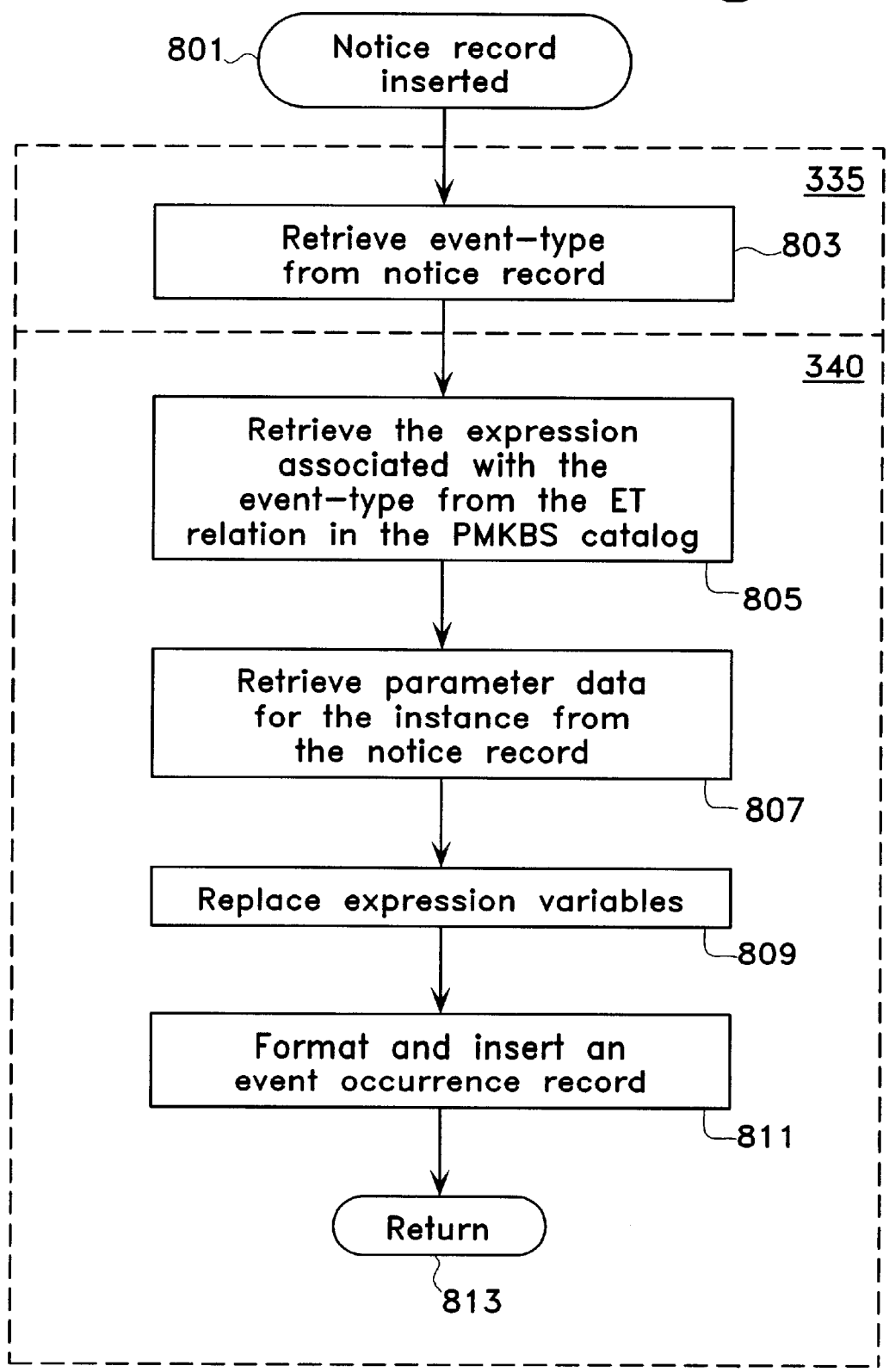
FIGS. 8A to 8D depict operational flowcharts of functional elements in the PMKBS.

FIGS. 8A to 8E depict operational flowcharts of functional elements in the PMKBS. In the present embodiment, the depicted functional elements are implemented as software that may execute on a computer hardware configuration as previously described in relation to FIGS. 4A and 4B. FIG. 8A depicts a flowchart of the event discriminator 335 and the expression correlator 340, referring back to FIG. 3, which are integrated into one program module in the presently described embodiment. The event discriminator 335 comprises logic block 803. The expression correlator 340 comprises logic blocks 805 through 813.

The event discriminator 335 begins processing when a new record is inserted into the NOTICE table 580 as represented by logic block 801. The RDBMS employed in this embodiment includes support for triggers, or triggered program execution, which is known in the art (rf., e.g., Alan Freedman, *The Computer Desktop Encyclopedia* (AMACOM 1996). The trigger feature of the RDBMS permits the RDBMS user to define program code to be executed when "triggered" by events arising within the RDBMS. Triggering events may include, e.g., the insertion of a record, or the update of a particular field. The entry point of logic block 803 is defined as the target program for the trigger corresponding to the insert-new-row event of the NOTICE table.

As noted earlier, the NOTICE table 580 serves as the signal source 330 for the PMKBS in the present embodiment. Software that is executing on any computer able to insert a record into the NOTICE table, may inform the PMKBS about an occurrence of an event relevant to a subject process by inserting a NOTICE record. The executing software may or may not have been initialized, itself, by the PMKBS. For example, a transaction processing application program that is initiated by a computer user to record information about an order received in the mail, may insert a record into the NOTICE table to alert the PMKBS that an order has been received. An event is signaled to the PMKBS in order to utilize the processing logic defined to the PMKBS.

Event discrimination identifies the type of event represented by an input signal. Performing event discrimination in the present embodiment is straightforward, as the event-type identifier exists as a field within the NOTICE table. The event discriminator 335 extracts the value in this field from the newly inserted record, in logic block 803. The event discriminator 335 is aware of the identity of the newly inserted record by means of the RDBMS's triggering process. PMKBS processing then continues on to the expression correlator 340.

The process of expression correlation resolves an expression that is used to determine some condition relevant to the subject process. In logic block 805, the expression correlator 340 uses the event-type identifier passed by the event discriminator 335 to locate the expression template that corresponds to the instant event-type. The expression correlator locates and retrieves the expression template by querying the RDMBS for the active record in the ET table with a matching event-type identifier.

In logic block 807, the expression correlator retrieves and parses the parameter data field from the newly inserted NOTICE record. Parsing data fields to isolate and identify individual constituent elements is well known in the art. In logic block 809, the expression correlator specializes the just retrieved expression template, performing any variable substitution, possibly using the parsed parameter data.

In logic block 811, the expression correlator fixes values for the event-type identifier, notice identifier, expression, and the time stamp fields for an event occurrence record. The expression correlator then inserts the new event occurrence record into the table named after the event-type, using the services of the RDBMS. The expression correlator then terminates its processing in logic block 813.

The expression correlator program code in this embodiment may not directly pass control to the evaluator program code, to continue the processing of the input signal. Instead, it may reach the evaluator program code through the RDBMS trigger mechanism when, in logic block 811, the expression correlator program code inserts the new event occurrence record.

Figure 8B:
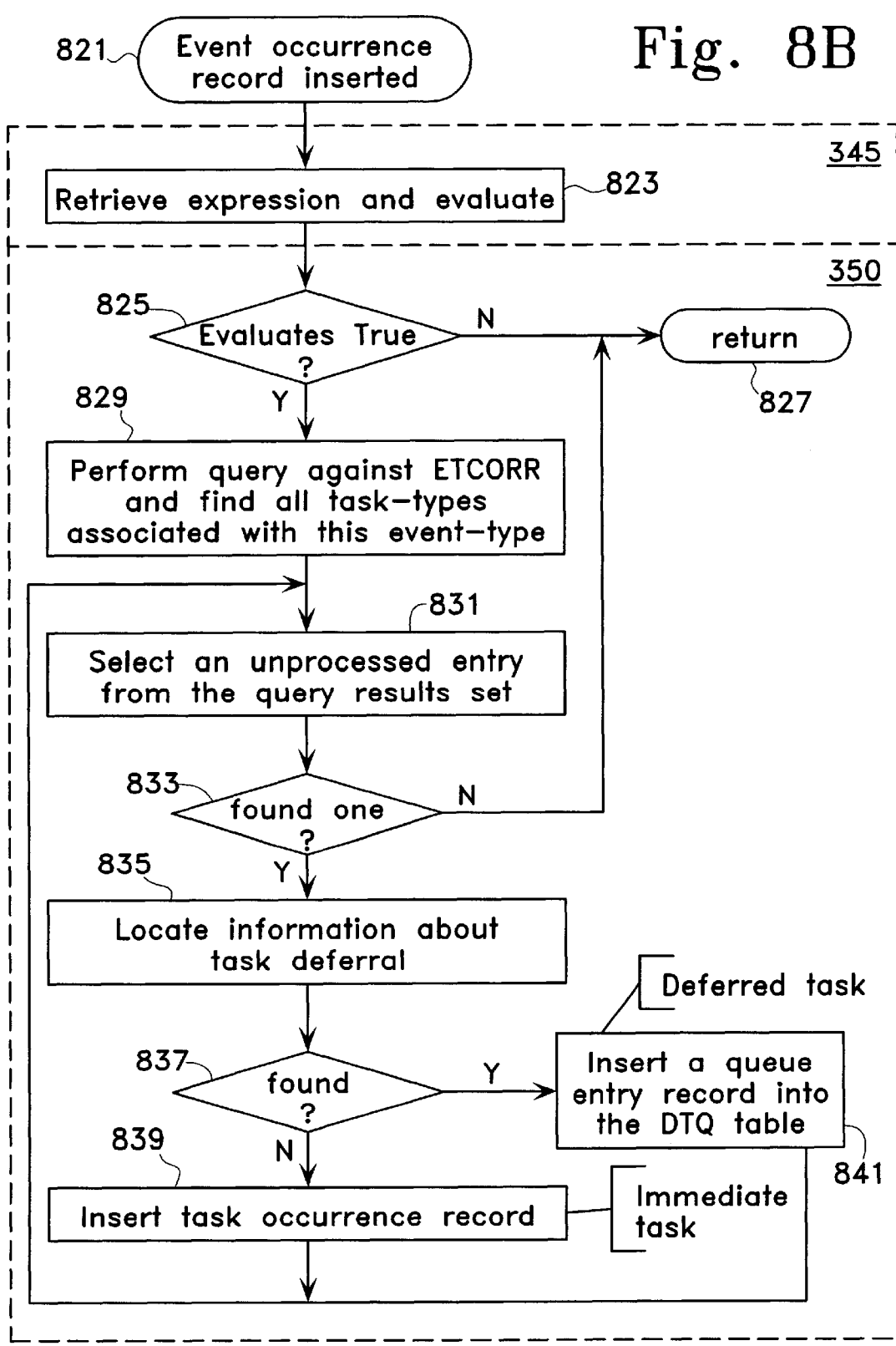

FIG. 8B depicts a flowchart of the expression evaluator 345 together with the task correlator 350. The expression evaluator 345 and task correlator 350 are integrated into one program module in the presently described embodiment. The expression evaluator comprises logic block 823. The task correlator comprises logic blocks 825 through 841.

The process of expression evaluation determines some condition relevant to the subject process. The expression evaluator 345 begins processing when. a new record is inserted into an event occurrence table as represented by logic block 821. The entry point of logic block 823 is defined as the target program for the trigger corresponding to the insert-new-row event of each event occurrence table. Logic block 823 retrieves the expression field from the newly inserted record, and evaluates it to a single resulting value. Often, the resulting value represents the current state condition of some aspect of the subject process. The evaluator 345 then stores the resulting value in the expression value field of the instant record. Processing continues to the task correlator 350.

The task correlation process identifies the course or courses of action to take given the occurrence of a particular type of event at a time when a particular condition exists. The task correlator 350 tests the value resulting from expression evaluation to determine which, if any, task execution should arise from the particular resulting value from the particular event-type. In the presently described embodiment, the expressions are predicate logic expressions, as described earlier in reference to FIG. 6A, that result in a truth value. In the present embodiment, subsequent task execution only occurs when the resulting truth value is "TRUE." In logic block 825, the task correlator tests whether the resulting value is "TRUE." If it is not, processing of the task correlator, and the input signal, terminate at logic block 827 because in this embodiment, only "TRUE" conditions lead to executable responses.

If the resulting value is "TRUE," the task correlator in logic block 829 performs a query against the ETCORR table, using the event-type identifier as a search argument, to find all task-types associated with the instant event-type. In the present embodiment an event-type can be associated with multiple task-types. This further contributes to reuse of elements of processing logic by encouraging modules task-type design. Task-types can, in effect, be used as subroutines are in traditional programming languages.

In block 831, the task correlator selects an ETCORR record 640 from the query result produced by logic block 829—one that has not been previously selected. In logic block 833, the task correlator tests whether all of the ETCORR records in the query result have already processed. If so, the task correlator terminates in logic block 827 because all appropriate courses of action have been forwarded toward the task initiator.

If the task correlator 350 finds an unprocessed ETCORR record 640 in the query results, it determines whether the task should be deferred or executed immediately, by looking for a non-blank value in the scheduled-time expression template field 645 of the instant ETCORR record 640. Logic block 835 tests whether an execution-time expression is found.

Scheduled-time expressions represent a future time, so if a scheduled-time expression is not found, the task is, by definition, immediately executable and control passes to logic block 839. In this case, the task correlator will insert a record 740 into a task-type occurrence tables. The task correlator retrieves the task-type definition record 620 identified by the task-type identifier in the instant ETCORR record from the query result. The task correlator then fixes values for the task-type identifier 741, notice identifier 743, executable response 745 fields for a task occurrence record 740 using values from the corresponding fields of the task-type definition record 620. The task correlator may perform specialization of the executable response field 745 in the manner the expression correlator performs specialization for the event occurrence's expression field.

The value of the time stamp field 747 is fixed with the time-of-day value customarily available from the computer system. The task correlator then inserts a new task occurrence record 740 into the table named after the task-type, using the services of the RDBMS. Inserting the record 740 logs the PMKBS processing activity and incites the execution of the task initiator code. Control then passes back to logic block 831 to process any other tasks associated with the event-type.

If a scheduled-time expression is found, the task is, by definition, a deferred task and control passes to logic block 841. In this case, the task evaluator 350 will insert a record 750 in the delayed task queue table where it will be held until its scheduled time. The task correlator retrieves the task-type definition record 620 identified by the task-type identifier in the instant ETCORR record 640 from the query result. The task correlator then fixes values for the task-type identifier 753, notice identifier 755, and executable response 757 fields for a delayed task queue record 750 using values from the corresponding fields of the task-type definition record 620. The task correlator 350 may perform specialization of the executable response field 757.

The task correlator evaluates the scheduled-time expression from the instant ETCORR record 640 in the query result from logic block 831, to produce a date-time value for the earliest execution time for the task. The task correlator then fixes the value for the scheduled-time field 751 using the date-time value for the earliest execution time as just determined. The task correlator then inserts a new record 750 into the DTQ table using the services of the RDBMS. Control then passes back to logic block 831 to process any other tasks associated with the event-type. Processing proceeds from the task correlator code to the task initiator code by means of the RDBMS trigger mechanism.

Figure 8C:
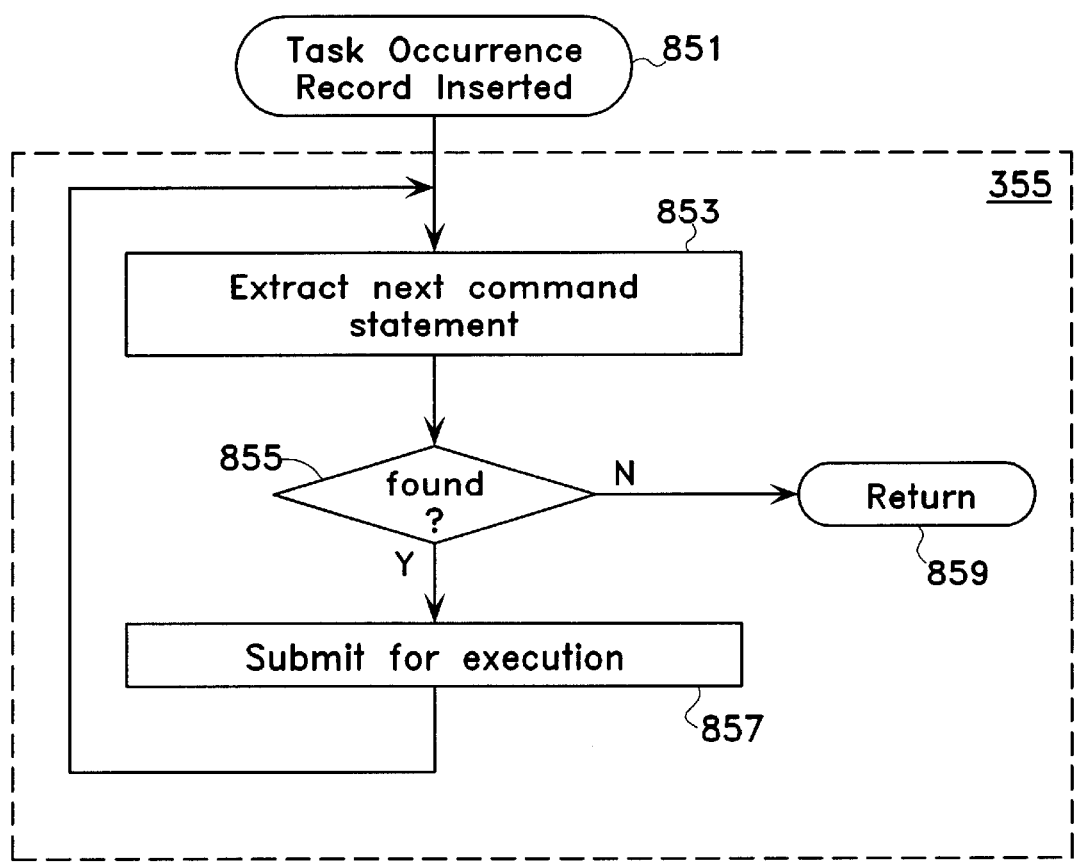

FIG. 8C depicts a flowchart of the task initiator code. The task initiator starts the execution of courses of action identified by task correlation processing. The task initiator 335 begins processing when a new record 740 is inserted into a task occurrence table. The entry point of logic block 853 is defined as the target program for the trigger corresponding to the insert-new-row event of each task occurrence table. Starting at the beginning of the field, logic block 853 retrieves the next statement from the executable response field 745 of the newly inserted task occurrence record 740. Logic block 855 then tests whether a statement is found. If not, the task initiator terminates its processing in logic block 859 because each of the statements included in the task definition has been submitted for execution. If a statement is found, logic block 857 submits the statement to an execution engine 360 for execution.

In the presently described embodiment, two execution engines are used. The RDBMS serves as the execution engine for "SQL:" statements in the executable response field. The operating system, accessed directly or indirectly, serves as the execution engine for "PRG:" statements in the executable response field.

Figure 8D:
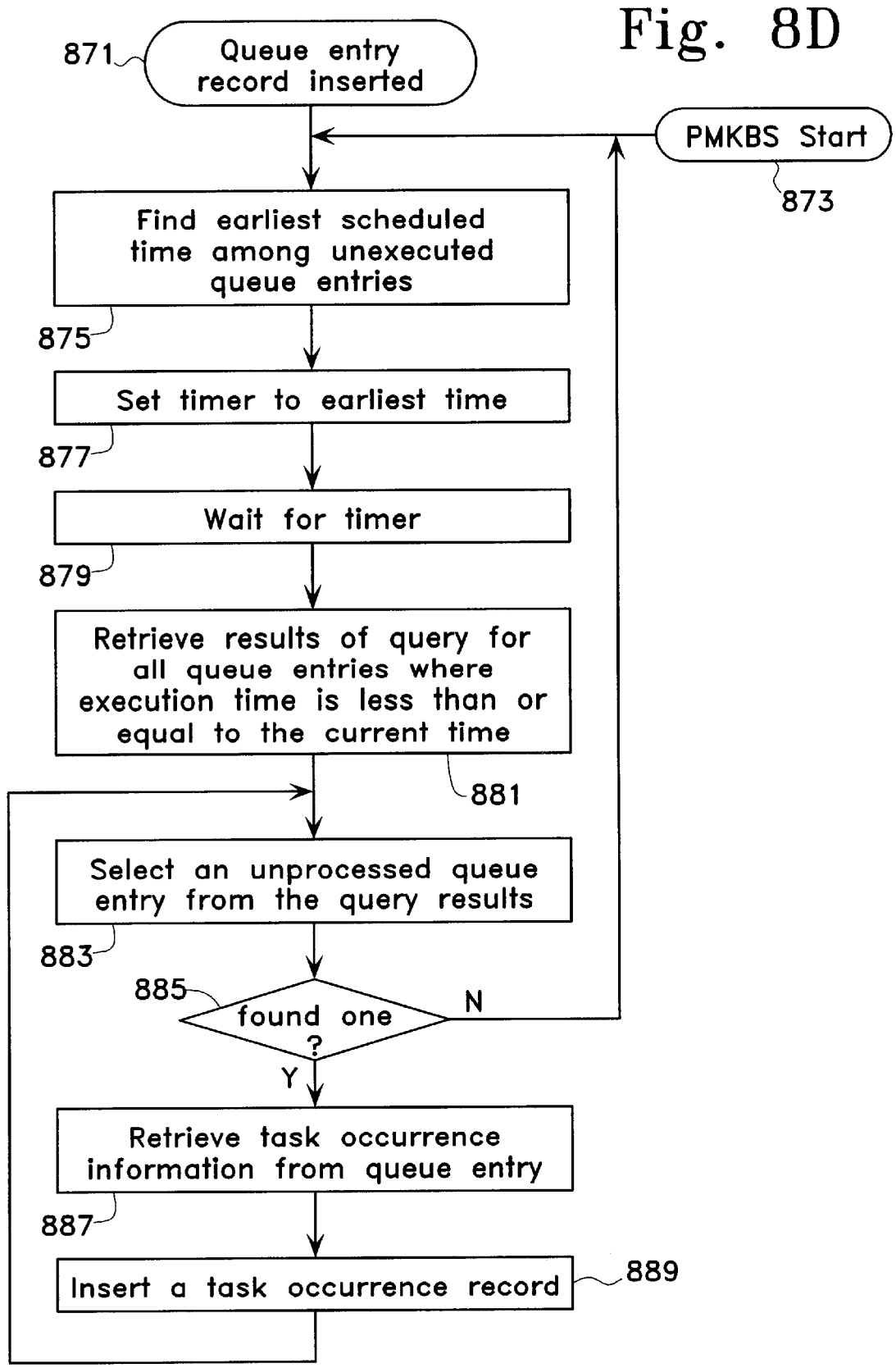

FIG. 8D depicts a flowchart of the queue monitor code. The queue monitor process initiates execution of deferred tasks at their scheduled times. The queue monitor in this embodiment is a subcomponent of the task initiator 355 functional block. More specifically, it extends the main task initiator code to provide for the execution of tasks on a deferred basis. The basic function of the queue monitor is to remain aware of outstanding deferred tasks represented as records in the deferred task queue table, and to instigate their execution at the scheduled time.

The queue monitor initialization code in logic block 875 is principally invoked whenever a new entry is placed into the DTQ table as represented by logic block 871. This may be achieved using the insert-new-row trigger of the DTQ table. The queue monitor initialization code may also be invoked in an alternative embodiment having program code that is executed to start or restart operation of the PMKBS as represented by logic block 873.

To initialize the queue monitor, logic block 875 queries the DTQ table 575 to find the record 750 representing the unexecuted task containing the lowest, i.e., earliest, date-time value in the scheduled-time field 751. Logic block 877 then sets a timer to that lowest date-time value. The operating system or a subsystem may provide the timer function. In logic block 879, the queue monitor waits for the timer to expire.

When the timer expires, the queue monitor queries the DTQ table 575 for all records having a scheduled-time value less than or equal to the current time. This happens in logic block 881. Then, in logic block 883, the queue monitor selects a DTQ record from the query results—one that has not been previously selected. Logic block 885 tests whether such a record is found. If not, control passes back to logic block 875 to reset the timer for the next scheduled task time. If a record is found and selected, control passes to logic block 887 where the task-type identifier 753, notice identifier 755, and executable response field 757 values are retrieved from the instant DTQ record and then fixed as the values for the corresponding fields in a task occurrence record 740. The value of the time-stamp field 757 is fixed with the time-of-day value that is customarily available from the computer system. In logic block 889, the queue monitor then inserts a new task occurrence record 740 into the table named after the task-type, using the services of the RDBMS. Inserting the record 740 into the task occurrence table indirectly invokes the main task initiator code to ultimately submit the task for execution. After inserting the new record 740, control passes back to logic block 883 to process any other DTQ records ready for execution.

PMKBS Operational Example

The following operational example is intended to facilitate an understanding of the invention as employed in the present embodiment. The figures accompanying the example show only those elements most useful for describing the example.

The chosen example is based on a hypothetical inventory control system as may be employed by a business concern. The example describes the first response of the PMKBS to the removal of parts from the inventory. In the processing logic for the hypothetical business, changes to the inventory of a part cause an automated purchase requisition to be generated when the inventory drops below a threshold level.

Figure 9:
FIG. 9 depicts the software and data components residing on a storage device for illustrating the operation of the PMKBS in one embodiment of the invention.
Figure 9A:
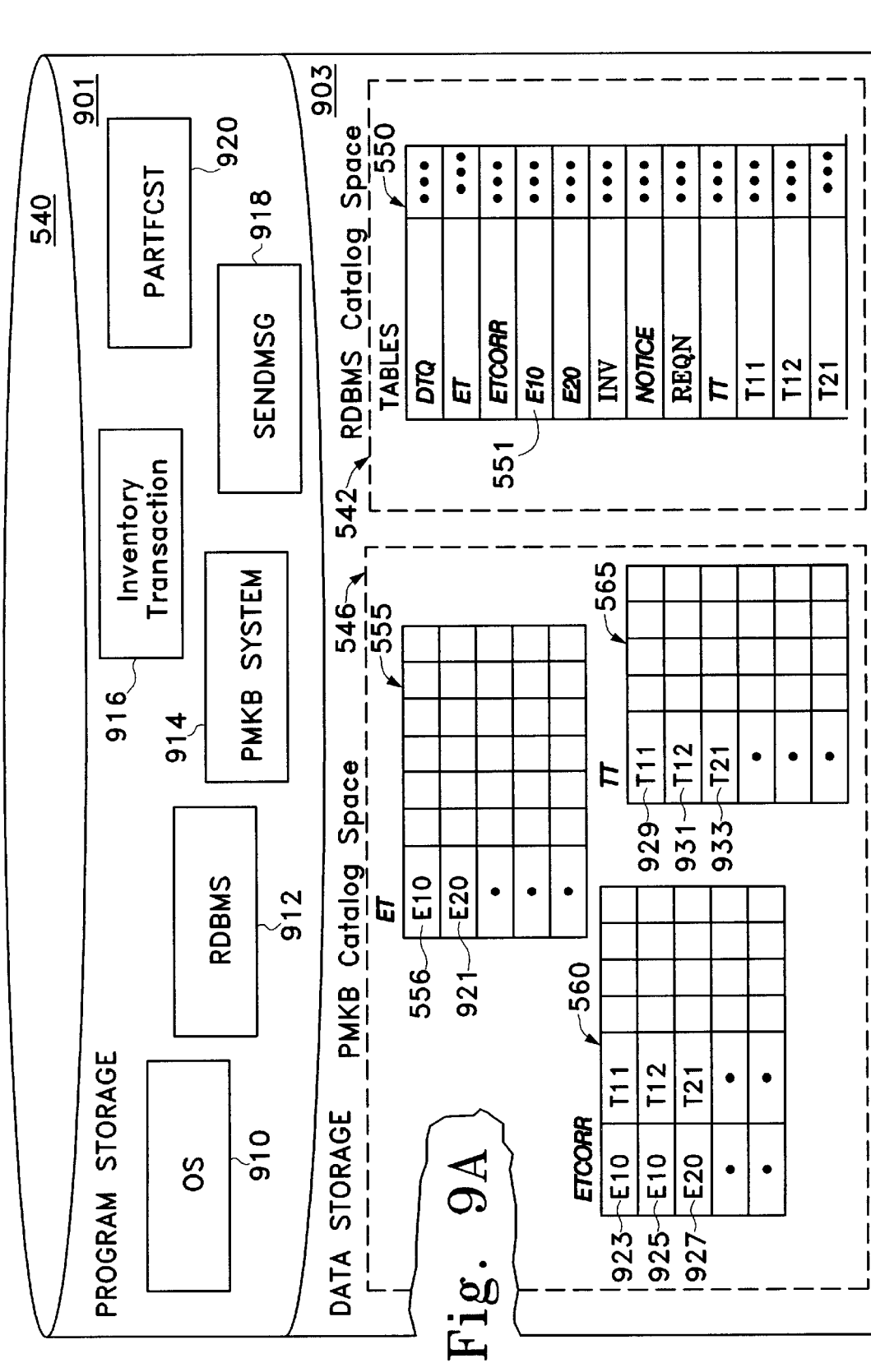
Figure 9B:
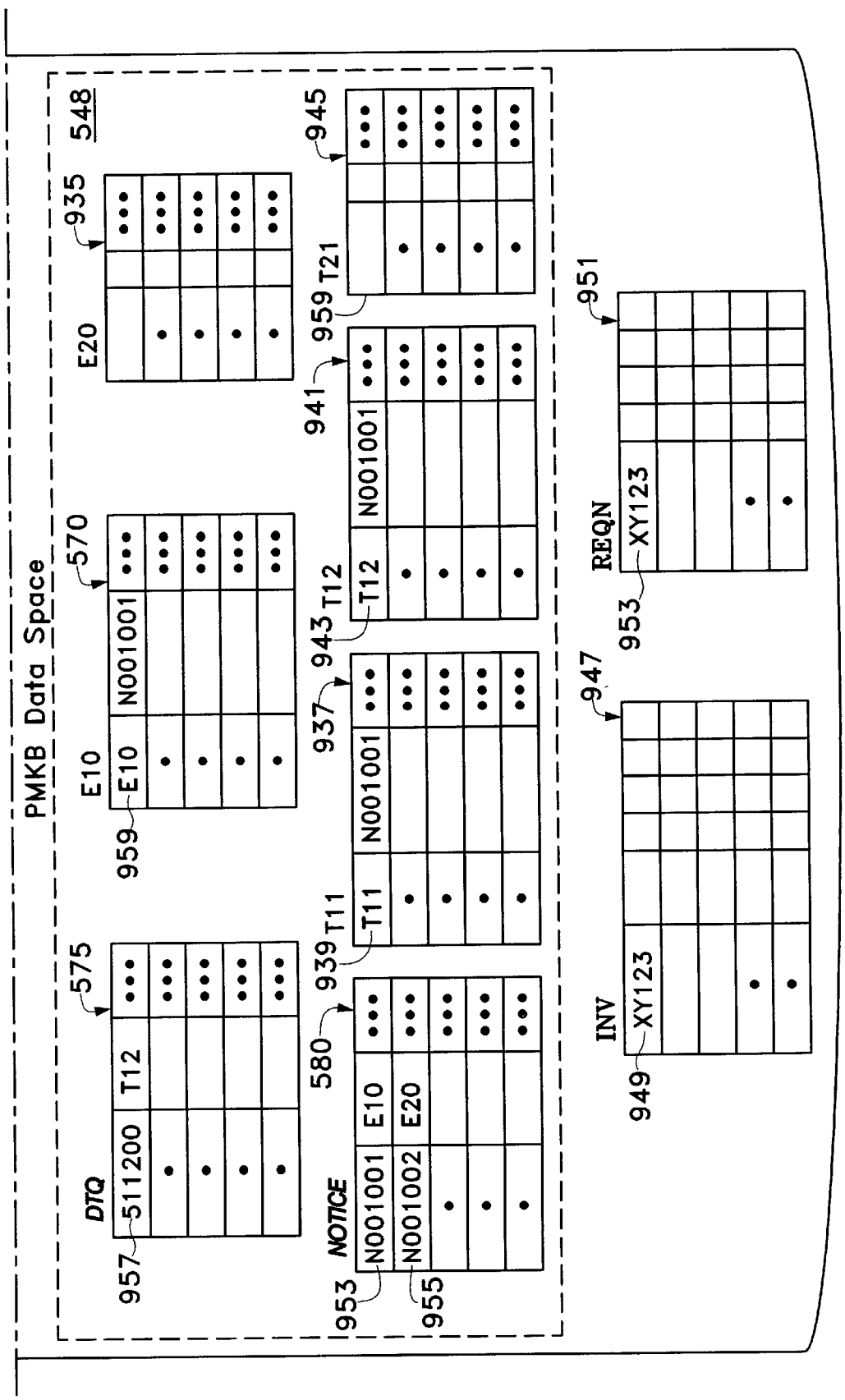

FIG. 9 depicts the software and data components on a memory medium 540 for illustrating the operation of the PMKBS in one embodiment. FIG. 9 depicts memory medium 540 containing operating system 910, RDBMS 912, PMKBS 914, inventory transaction 916, SENDMSG 918, and PARTFCST 920 program code; RDBMS catalog 542, PMKB catalog 546, PMKB data 548, and general data 903 logical spaces; and relational tables named TABLES 550, ET 555, TT 565, ETCORR 560, DTQ 575, NOTICE 580, E10 570, E20 935, T11 937, T12 941, T21 945, INV 947, and REQN 951.

The memory medium 540 provides persistent storage for copies of the program and data it contains. The programs and data are copied, in whole or in part, from the memory medium to memory, where they may be directly utilized by the CPU. Operating system program code 910 is loaded into memory and executed by the CPU, and other program code and data is loaded to and from memory and utilized, by means well known and well understood in the art. One skilled in the art also recognizes that the memory medium 540 may comprise one or more possibly disparate devices.

The operating system (OS) program code 910 is appropriate to the underlying hardware and may be one of many commercially available operating systems; e.g., UNIX, Microsoft Windows NT, VMS, or MVS. A variety of hardware platforms and operating systems may be utilized in a networked environment.

The RDBMS program code 912 is compatible with the underlying hardware and operating system. The RDBMS program code may be one of many commercially available RDBMS software products; e.g., ORACLE, SQL-Server, DB2, or Microsoft Access.

The PMKBS program code 914 comprises event discriminator, expression correlator, evaluator, task correlator, and task initiator portions as described earlier. This program code may be created and maintained using one or more computer languages; e.g., C, C++, BASIC, VISUAL BASIC, COBOL, or Assembler.

The inventory transaction 916, SENDMSG 918, and PARTFCST 920 programs are application or utility programs existing apart from the PMKBS, are exemplary only, and form no part of the present invention. The programs play a role in an example subject process used here to illustrate the operation of one PMKBS embodiment.

In the presently preferred embodiment, the RDBMS catalog space 542 contains the TABLES table 550 as discussed earlier in reference to FIG. 5. The PMKB catalog space 546 contains the ET 555, TT 565, and ETCORR 560 tables that have been populated as discussed earlier in reference to FIG. 5, having record formats discussed earlier in reference to FIGS. 6A to 6C. The PMKB data space 548 contains NOTICE 580, DTQ 575, event occurrence (E10 and E20) 570, 935, and task occurrence (T11, T12, and T21) 937, 941, 945 tables, created as discussed earlier in reference to FIG. 5, having record formats discussed earlier in reference to FIGS. 7A to 7D. The general data space 903 contains INV 947 and REQN 951 tables existing apart from the PMKBS, are exemplary only, and form no part of the invention. The tables play a role in an example subject process used here to illustrate one PMKBS embodiment.

Note that the RDBMS catalog 542, PMKB catalog 546, PMKB data 548, and general data 903 spaces represent logical groupings to facilitate a conceptual understanding of the present embodiment of the invention. One skilled in the art recognizes that the logical groupings may or may not be reflected by equivalent groupings using grouping mechanisms provided by, e.g., the operating system, network, or RDBMS.

The following discussion of FIGS. 10A to 13B describes sample contents of tables depicted in FIG. 9. After the discussion of the contents of the tables, a processing example making use of those contents is described. The two discussions considered together illuminate one practice of the invention and its advantageous use in representing and executing processing logic using a computer.

FIGS. 10A to 10C depict abbreviated sample contents of PMKBS catalog tables for purposes of illustration. The tables are process-independent because their structures exist as part of the PMKBS without regard to any subject process defined to the PMKBS (although their contents may reflect subject process matter). Fields and records unnecessary to the illustration have been omitted, in order not to obscure an understanding of the invention. A processing example making use of the sample contents follows the discussion related to FIG. 13B.

FIG. 10A depicts sample records in the ET table 555. A record here reflects the occurrence of some event relevant to a subject process. The first and second records 556, 921 shown have event-type identifier values of E10 and E20, respectively. The first and second records 556, 921 have expression template values complying with the following syntax. The expression template is an expression. An expression is made up of a first argument, followed by an arithmetic or comparison operator, followed by a second argument. Each argument may be a constant, a variable, or an expression. A variable may be a parameter variable, identified by a dollar sign ($) prefix, or a table-data-value variable, identified by enclosure in square brackets ([ . . . ]). Table-data-value variables consist of a table name, followed by a period (.), followed by a primary key value, followed by a period (.), followed by a column name. A table name, primary key value, or column name field of a table-data-value variable, may itself be a variable.

FIG. 10B depicts sample records in the TT table 565. The first, second, and third records 929, 931, 933 shown have task-type identifier values of T11, T12, and T21, respectively. Each record also has an executable response value that is a list of executable response statements complying with the syntax discussed earlier in reference to Table 1; each statement in the list after the first, separated from the previous statement by a semi-colon.

FIG. 10C depicts sample records in the ETCORR table 560. The first, second, and third records 923, 925, 927 shown have event-type identifier values of E10, E10, and E20, respectively; and task-type identifier values of T11, T12, and T21, respectively. The second record 925 shown has a value in the execution time expression template field compliant with the following syntax. The execution time expression template is a date-time expression. A date-time expression consists of a date constant or variable, followed by a colon, followed by a time constant or variable.

FIGS. 11A to 11B depict abbreviated sample contents of PMKBS process-independent operational data tables useful for purposes of illustration. The tables are process-independent because their structures exist as part of the PMKBS without regard to any subject process defined to the PMKBS (although their contents may reflect subject process matter). The records shown reflect a snapshot of the database at the completion of the processing example. (Records may exist at the onset of the described processing, or be inserted as a result of the processing.) Fields and records unnecessary to the illustration have been omitted, in order not to obscure an understanding of the invention. A processing example making use of the sample contents follows the discussion related to FIG. 13B.

FIG. 11A depicts sample records in the NOTICE table 580. A record here reflects the occurrence of some event relevant to a subject process. The first and second records 953, 955 shown have notice identifier values of N001001 and N001002, respectively. In the presently described embodiment, notice identifiers consist of a sequential number prefixed with the letter "N" and uniquely identify each record from among the others in the table. The first and second records 953, 955 shown have event-type identifier values of E10 and E20, respectively. The first and second records shown both have parameter data field values compliant with the syntax previously discussed in reference to Table 2 used to store contextualizing data used during the specialization process.

FIG. 11B depicts a sample record in the DTQ table 575. A record here represents that a task was scheduled for execution on a delayed basis. The record 957 shown has a value in the scheduled-time field that is a numeric value representing the number of seconds elapsed from a system-defined base date and time. For example, if the system-defined base date and time is Jan. 1, 2000 at 12:00:00 A.M., then the time value for Jan. 1, 2000 at 12:01:00 A.M. is 60. The record 957 shown also has a value in the task-type identifier field of T12, and a value in the notice identifier field of N001001.

FIGS. 12A to 12D depict abbreviated sample contents of PMKBS process-dependent data tables useful for purposes of illustration. The tables are process-dependent because their structures and contents exist as part of the process of defining the processing logic for a subject process to the PMKBS. The records shown reflect a snapshot of the database at the completion of the processing example. (Records may exist at the onset of the described processing, or be inserted or updated as a result of the processing.) Fields and records unnecessary to the illustration have been omitted, in order not to obscure an understanding of the invention. A processing example making use of the sample contents follows the discussion related to FIG. 13B.

FIG. 12A depicts sample records in an E10 table 570. A record here indicates an occurrence of an E10-type event during the operation of the subject process. One record 959 is shown having values in the event-type identifier, notice identifier, expression, and expression value fields of E10, N001001, 9<10, and TRUE, respectively.

FIG. 12B depicts sample records in a T11 table 937. A record here indicates that events and conditions occurring in the subject process indicated a need to perform a task of the T11 type. One record 939 is shown having values in the task-type identifier and notice identifier fields of T11 and N001001, respectively. The record 939 also has a value in the executable response field which is a list of three executable response statements.

FIG. 12C depicts sample records in a T12 table 941. A record here indicates that events and conditions occurring in the subject process indicated a need to perform a task of the T12 type. One record 943 is shown having values in the task-type identifier and notice identifier fields of T12 and N001001, respectively. The record 943 also has a value in the executable response field that is a list containing a single executable response statement.

FIG. 12D depicts sample records in a T21 table 945. A record here indicates that events and conditions occurring in the subject process indicated a need to perform a task of the T21-type. An empty record 959 is shown.

FIGS. 13A to 13B depict sample contents of hypothetical data tables as may be employed in an inventory management application of a manufacturing business. The hypothetical data tables and the hypothetical inventory management application are exemplary only and form no part of the present invention. The records shown reflect a snapshot of the tables at the completion of the processing example. (Records may exist at the onset of the described processing, or be inserted as a result of the processing.) A processing example making use of the sample contents follows the discussion related to FIG. 13B.

FIG. 13A depicts sample records in a hypothetical Inventory (INV) table 947 that forms no part of the present invention. The INV table 947 in this example contains information about an inventory of parts maintained in a stockroom. An INV record contains a part number field as its primary key; a buyer code field containing an identifier for the purchasing agent responsible for buying the part; a quantity-on-hand field for recording the quantity-on-hand of the part; a minimum-quantity field for recording the minimum number of the part to maintain in inventory; and a purchase-quantity field for recording the quantity of the part to be purchased when a new order is placed. One record 949 is shown having values in the part number, buyer code, quantity-on-hand, minimum-quantity, and purchase-quantity fields of Y123, ABC, 9, 10, and 36, respectively.

FIG. 13B depicts sample records in a hypothetical Purchase Requisition (REQN) table 951 that forms no part of the present invention. The REQN table in this example contains information about new purchase orders that need to be placed. A REQN record contains a part number field as its primary key; a quantity field indicating the quantity to order; and a requestor field for recording the identity of the entity responsible for requisitioning the parts. One record 953 is shown having values in the part number, quantity, and requestor fields of Y123, 36, and PMKBS, respectively.

An example of PMKBS operation will now be described in reference to FIG. 9, and the more detailed descriptions of the table contents of FIG. 9 as depicted in FIGS. 10A to 13B.

The example starts with a stockroom clerk removing some quantity of an item having a part number of Y123, from the stockroom inventory. As part of his/her duties, the stockroom clerk records the removal of the parts from inventory by accessing his/her company's inventory transaction program 916 via a computer terminal located in the stockroom. According to the processing logic used by the hypothetical company every change to the quantity of a part in the inventory should be checked to see if the part needs to be reordered; and, if so, then order the part, forecast its usage rate and inventory level, and check to see if there is a critical shortage.

The inventory transaction program 916 used by the stockroom clerk updates the value in the quantity-on-hand field of the inventory record 949 for part number Y123, from its previous value to 9, the new quantity on hand 1314. Then the application program 916 notifies the PMKBS of the change in inventory by inserting a notice record instance 953 into the NOTICE table 580. Alternatively, program code associated with the trigger for an update on the quantity-on-hand field could insert the notice record 953.

A unique notice identifier is generated by the program code 916 inserting the notice record 953, and recorded in the notice identifier field 1110 of the record 953. The event-type identifier associated with a change in quantity-on-hand event, E10, is recorded in the record 953. The part number associated with the particular instance of this event-type is recorded in the parameter data field 1114 in the record 953, using the keyword of PNPARM (for part number parameter). Insertion of the NOTICE record 953 incites execution of PKMBS program code as depicted in FIG. 8A by logic block 801. The PMKBS is alerted to the change in the quantity of a part in the inventory.

Referring to FIGS. 8A and 9, in logic block 803, the event discriminator 335 extracts the E10 value from the event-type identifier field 1112 of the input signal, i.e., the newly inserted NOTICE record 953. In logic block 805, the expression correlator 340 retrieves the expression template, [INV.$PNPARM.QUANTITY-ON-HAND]<[INV.$PNPARM.MINIMUM-QUANTITY], from the E10 record 956 in the ET table 555. This expression will test for the condition that the part needs to be reordered. In logic block 807, the expression correlator retrieves and parses the parameter data, PNPARM=XY123, from the newly inserted NOTICE record 953 to identify and isolate the keyword and its associated value.

In logic block 809, the expression correlator specializes the expression template. First, substitutions are made for parameter variables in the model expression, resulting in [INV.XY123.QUANTITY-ON-HAND]<[INV.XY123.MINIMUM-QUANTITY]. Next, substitutions are made for table-data-value variables. [INV.XY123.QUANTITY-ON-HAND] is replaced with 9, the value from the QUANTITY-ON-HAND field 1314 of the Y123 record 949 of the INV table 947. [INV.XY123.MINIMUM-QUANTITY] is replaced with 10, the value from the MINIMUM-QUANTITY field 1316 of the Y123 record 949 of the INV table 947. The resulting specialized expression is 9<10.

In logic block 811, the expression correlator formats and inserts new record 959 into the E10 table. Values for the event-type identifier, notice identifier, and expression fields are fixed at E10, N001001, and 9<10, respectively. At this point in time, the expression value field 1216 is empty.

Insertion of the new record 959 into the E10 table 570 incites execution of PKMBS program code as depicted in FIG. 8B by logic block 821. In logic block 823, the evaluator 345 evaluates the expression 9<10 according to the syntax and rules of predicate logic, producing a resulting value of TRUE, indicating that the part needs to be reordered. The evaluator updates the expression value field 1216 in the E10 record xx to reflect the TRUE result.

In logic block 825, the task correlator 350 tests the result 1216 to determine if it is TRUE. Because it is true, logic block 829 queries the ETCORR table 560 finding two records 923, 925 with an event-type identifier of E10. In logic block 831, the task correlator tries to select an unprocessed record from the two discovered in the last step 829. Record 923 is selected and logic block 833 is satisfied. The PMKBS has determined that task-type T11 is a course of action that should be taken. Logic block 835 retrieves any value in the execution-time expression template field 1044 in the selected record 923. None is found, meaning that the task is to be executed immediately, so processing proceeds to logic block 839. The task correlator formats and inserts new record 939 into the T11 table 937. The values for the task-type identifier 1220 and notice identifier fields 1222 of the new record 939 are set to T11 and N001001, respectively. The task correlator retrieves the value from the executable response field 1022 of the T11 record 929 of the TT table 565, specializes it, and fixes the specialized version as the value for the executable response field 1224 of the new record 939 in the T11 table 937. After the record 939 is inserted, the task correlator loops back to logic block 831.

The task correlator 350 tries to select an unprocessed record from the two discovered when logic block 829 last processed. Record 925 is selected and logic block 853 is satisfied. The PMKBS has determined that task-type T12 is a course of action that should be taken. Logic block 835 then retrieves any value in the execution-time expression template field 1052 in the selected record 925. The value $$TODAY:22:00:00 is retrieved, indicating deferred execution of the task, e.g., at 10:00 P.M. this evening, so processing proceeds to logic block 841. The task correlator 350 formats and inserts new record 957 into the DTQ table 575. The date-time expression $$TODAY:22:00:00 is evaluated to an absolute system date-time value. The absolute date-time value is fixed as the value for the scheduled-time field 1130 of the new record 957. Values for the task-type identifier 1132 and notice identifier 1134 fields are set to T12 and N001001, respectively. The task correlator retrieves the value from the executable response field 1026 of the T12 record 931 of the TT table 565, specializes it, and fixes the specialized version as the value for the executable response field 1136 of the new record 957 in the DTQ table 575. After the record 957 is inserted, the task correlator loops back to logic block 831.

The task correlator 350 tries to select an unprocessed record from the two discovered when logic block 829 last processed. At this point, no unprocessed records remain so the task correlator terminates its processing related to the instant input signal in logic block 827.

Earlier insertion of a new record 939 into the T11 table by the task correlator, incited execution of PKMBS program code as depicted in FIG. 8C. In logic block 853, when incited, the task initiator 355 extracts the specialized SQL:insert requisition record statement 1226 from the list in the executable response field 1224 of the newly inserted record 939. Logic block 855 is satisfied so logic block 857 performs any necessary formatting of the statement, i.e., to make it conform with RDBMS interface specifications, and uses the RDBMS's interface to submit the statement for execution. This action causes the placement of a new order for the part. As a result of ensuing RDBMS action, a new record 953 is inserted into the REQN table 951.

In the present embodiment, execution of the statement submitted 1226 to the RDBMS and the processing of the task initiator 355 are asynchronous. Asynchronous operation of different program processes in a computer system is well known in the art. Having a design that permits asynchronous operation facilitates the exploitation of multiple processor CPU configurations including parallel processors.

So, at the point in time the request was made in logic block 857 to the RDBMS to execute the statement, the task initiator 355 looped back to logic block 853 without waiting for completion of execution of the statement by the RDBMS.

In logic block 853, the task initiator extracts the specialized SQL:insert E20 notice record statement 1228 from the list in the executable response field 1224 of the newly inserted record 939. Logic block 855 is satisfied so logic block 857 performs any necessary formatting of the statement 1228, and uses the RDBMS's interface to submit the statement for execution. This action leads to an evaluation of whether a critical shortage condition exists. As a result of ensuing RDBMS action, a new record 955 is inserted into the NOTICE table 580. As before, the task initiator loops back to logic block 853 without waiting for completion of execution of the statement 1228 by the RDBMS.

In logic block 853, the task initiator attempts to extract another statement from the list in the executable response field 1224 of the newly inserted record 939. None is found, logic block 855 is not satisfied, so the task initiator 355 terminates its immediate processing in logic block 859.

Earlier insertion of a new record 957 into the DTQ table 575 by the task correlator 350 incited execution of PKMBS program code as depicted in FIG. 8D. In logic block 875, when incited, the queue monitor extension to the main task initiator queried the DTQ table 575 to locate the record with the lowest, i.e., earliest, value in the scheduled-time field. Assuming, for the sake of example, that the query produced record 957, logic block 877 extracts the 511200 value from the scheduled-time field 1130 of the record 957. The queue monitor converts the value if necessary to a format compatible with a timer function, and sets an operating system or subsystem timer function to expire at the designated time of, e.g., 10:00 P.M. this evening. The queue monitor then waits in logic block 879 for the timer to expire, actively or passively, using methods well known in the art. At 10:00 P.M. in the evening when the timer does expire, processing continues in logic block 881.

The queue monitor queries the DTQ table 575 or all unprocessed records having a value in the scheduled-time field that is less than or equal to the value of the current date and time. This query returns record 957, logic block 885 is satisfied, and processing continues in logic block 887.

The queue monitor retrieves T12, N001001, and PRG:execute forecasting program values from the task-type identifier 1132, notice identifier 1134, and executable response 1136 fields of the DTQ record 957, respectively. These values are fixed as the values for the corresponding fields in a T12 table record, and a new T12 record 943 is inserted. Queue monitor processing then loops back to logic block 883. The earlier query in logic block 881 produced no other DTQ entries ready for execution, logic block 885 is not satisfied, so queue monitor processing loops back to logic block 875 where the queue monitor restarts its main processing loop.

Insertion of a new record 943 into the T12 table by the queue monitor, incites execution of PKMBS program code as depicted in FIG. 8C. In logic block 853, when incited, the task initiator extracts the specialized PRG:execute forecasting program statement 1243 from the list in the executable response field 1244 of the newly inserted record 943. Logic block 855 is satisfied so logic block 857 performs any necessary formatting of the statement, and uses an operating system or subsystem provided interface to submit the statement for execution to an execution engine like the operating system shell. This action causes a forecasting of the part's usage rate and inventory level per the design of the hypothetical application program. Like RDBMS executions, program executions are asynchronous in the present embodiment. As an example, the hypothetical program, PARTFCST 920, may perform an analysis of historic and projected usage rate and inventory level of part Y123. In the process, the program may incite the insertion of new records into the NOTICE table 580, to avail the process of which it is a part of the management and monitoring functions of the PMKBS.

In logic block 853, the task initiator attempts to extract another statement from the list in the executable response field 1244 of the newly inserted record 943. None is found, logic block 855 is not satisfied so the task initiator terminates its immediate processing in logic block 859.

At some point in time, The RDMBS completes execution of the specialized SQL:insert E20 notice record statement, submitted to it by the task initiator when processing record 939 in the T11 table 1220, as a result of processing for the N001001/E10 NOTICE table record 953. Execution of the specialized statement by the RDBMS creates record N001002 955 in the NOTICE table 580. The new NOTICE table record 955 is processed through the PMKBS in the same fashion as just described for the earlier, seminal NOTICE record 953. The insertion of the NOTICE 955 record leads to execution of the event discriminator, expression correlator, and the evaluator. The evaluator output may then lead to execution of the task correlator and task initiator. As the N001002 NOTICE record 955 was inserted by a task execution resulting from the N001001 NOTICE record 953, it can be seen that interdependencies may be incorporated into the PMKBS processing logic definitional structure, as would be required in applications of all but the simplest processes.

Various modifications to the preferred embodiment can be made without departing from the spirit and scope of the invention. For example, storage of data items in memory and memory media may generally be accomplished using various data structuring techniques well known in the art, e.g., arrays, lists, trees. Moreover, the value stored in a field representing a particular item of data may be a reference leading to the actual storage location of the particular item of data, rather than the desired item of data, itself. Such indirect addressing is well known in the art. Moreover, a references to, or address of, a data item is generally not limited to a value representing its physical location in a hardware memory, but may be any value that may be used, directly or indirectly, to locate the data item, e.g., ordinal position in a set, row and column coordinates in a table, offset from a base address. One skilled in the art recognizes these and other alternative may be employed without departing from the spirit and scope of the invention.

Other alternatives are readily apparent to one skilled in the art. For example, abstraction layers could be inserted at various places in the described embodiment. For example, in the described embodiment, a task-type leads directly to a set of command statements. As an alternative, a task-type could lead to a set of subtask-types, and each subtask-type in the set could, in turn, lead to a set of command statements. Such modifications are apparent to one skilled in the art and do not depart from the spirit and scope of the invention.

Thus, the foregoing description is not intended to limit the invention that is described in the appended claims in which:

What is claimed is:

1. A method of processing information in a computer system comprising:

proiding in computer readable medium an event data store which can store a plurality of respective event identifiers and respective expressions that indicate respective corresponding predicate logic expressions of condition that respectively correspond to respective events;

providing in computer readable medium a task data store that can store a plurality of respective task identifiers and respective corresponding response information that indicates respective groups of one or more command statements that correspond to respective tasks;

providing in computer readable medium a correspondences data store that can store a plurality of correspondences between respective event identifiers and respective one or more task identifiers;

providing in computer readable medium a notice data store that can store respective event data that respectively correspond to respective event identifiers;

identifying from the event data store a respective predicate logic expression of condition corresponding to a respective event identifier that corresponds to respective event data stored in the notice data store;

evaluating the identified predicate logic expression of condition using the respective event data so as to produce an evaluation result for the respective event;

identifying from the correspondence data store a correspondence between the respective event identifier and at least one respective task identifier;

identifying from the task data store at least one response information that indicates a respective group of one or more comman statements that correspond to the at least one identified task identifier; and executing a respective command statement that corresponds to the at least one identified task identifier only if the produced evaluation result for the respective event has a prescribed value.

2. The method of claim 1 wherein, evaluating involves evaluating the identified predicate logic expression of conditions to produce at least one of multiple possible evaluation result values; and identifying in the correspondence data store a correspondence between the event and at least one task involves identifying at least in part based upon the at least one evaluation result value.

3. The method of claim 1 wherein, evaluating involves evaluating the truth of an identified predicate logic expression of condition; and identifying in the correspondence data store a correspondence between the event and at least one task involves identifying based upon the event if the evaluation result is true.

4. The method of claim 1 wherein, evaluating involves evaluating the identified predicate logic expression of condition to produce at least one of multiple possible evaluation result values; and identifying in the correspondence data store a correspondence between the event and at least one task involves identifying at least in part based upon the event and the at least one evaluation result value.

5. The method of claim 1 wherein,:

the notice data store includes an application program data store of information;

wherein evaluating involves evaluating the expression of condition relative to information in the application program store.

6. The method of claim 1 wherein the at least one of the expressions in the event data store includes a reference to a predicate logic expression of condition.

7. The method of claim 1 wherein at least one command statement can invoke a computer program.

8. The method of claim 1 wherein at least one command statement can invoke a computer program.

9. The method of claim 1 wherein at least one command statement can invoke access to a relational database management system.

10. The method of claim 9 wherein the at least one response information includes information includes at least one relational database management system statement.

11. The method of claim 1 wherein at least one command statement can invoke access to a relational database management system.

12. The method of claim 1 wherein, at least one command statement can invoke of at least one relational database management system or can invoke a computer program.

13. The method of claim 1 wherein, the event data store is implemented in a event data store table;

the task data store is implemented in a task data store table;

the correspondence data store is implemented in a correspondence data store table; and the notice data store is implemented in a notice data store table.

14. The method of claim 1 wherein, the event data store is implemented in a conditions data store table;

the task data store is implemented in a responses data store table;

the notice data store is implemented in a notice data store table;

the correspondences data store is implemented in a correspondences data store table;

providing a relational database management system in the computer system;

using the relational database management system during the identifying in the event data store an expression corresponding to the event; and using the relational database management system during the identifying in the task data store a respective group of one or more commands corresponding to the at least one task.

15. The method of claim 1 further including:

providing in computer readable medium at least one event occurrence data store that can store event occurrence information;

storing in the event occurrence data store a log of event activity.

16. The method of claim 1 further including:

providing in computer readable medium at least one task occurrence data store;

storing in the at least one task occurrence data store a log of task activity.

17. The method of claim 1 further including:
providing in computer readable medium at least one task occurrence data store;
storing in the at least one task occurrence data store a log of task activity.

18. The method of claim 1 further including:
providing in computer readable medium a deferred task data store that can store information;
storing in the deferred task data store information corresponding to one or more deferred tasks.

19. The method of claim 1 further comprising:
providing in the task data store respective response information that respectively includes at least one command statement that invokes creation of respective new event data that respectively correspond to a respective new event and that invokes insertion of the respective new event data in the notice data store.

20. The method of claim 1,
wherein respective groups of one or more command statements consist of unordered command statements.

21. The method of claim 1,
wherein respective groups of one or more command statements consist of unbranched command statements.

22. The method of claim 1,
wherein the respective groups of one or more command statements consists of unordered, unbranched command statements.

23. The method of claim 1,
wherein the produced evaluation result for the event includes an evaluation truth result for the event.

24. The method of claim 1 further including:
performing the step of identifying from the task data store at least one response information that indicates a respective group of one or more command statements that correspond to the at least one identified task identifier only if the produced evaluation result for the respective event has a prescribed value.

25. The method of claim 1 further including:
performing the step of identifying fromthe correspondence data store a correspondence between the respective identified event and at least one respective task identifier only if the produced evaluation result for the respective event has a prescribed value, and
performing the step of identifying from the task data store at least one response information that indicates a respective group of one or more command statements that correspond to the at least one identified task identifier only if the produced evaluation result for the respective event has a prescribed value.

26. An article of manufacture comprising a computer readable medium with computer readable program code embodied therein for directing a computer system, the computer readable code in the article of manufacture comprising:
an event data store that can store a plurality of respective event identifiers and respective expressions that indicate a respective corresponding predicate logic expression of condition that respectively correspond to respective events;
a task data store that can store a plurality of respective task identifiers and respective corresponding response information that indicates respective groups of one or more command statements that respectively correspond to respective tasks;
a correspondence data store that can store a plurality of correspondence between respective event identifiers and respective one or more task identifiers;
a notice data store that can store respective event data that respectively correspond to respective event identifiers;
computer readable program code causing the computer to identify from the event date store a respective predicate logic expression of condition corresponding to a respective event identifier corresponding to respective event data stored in notice data store;
computer readable program code causing the computer to evaluate the identified predicate logic expression using the respective event data so as to produce an evaluation result for the respective event;
computer readable program code causing the computer to identify in the correspondence data store a correspondence between the respective event identifier and at least one respective task identifier; and
computer readable program code causing the computer to identify from the task data store a respective group of one or more command statements that correspond to the at least one identified task identifier; and
computer readable program code causing execution of a respective command statement that corresponds to at least one identified task identifier only if the produced evaluation result for the respective event has a prescribed value.

27. The article of manufacture of claim 26 wherein,
the computer readable program code causing the computer to evaluate causes an evaluation of the truth of he identified predicate logic expression of condition; and
the computer readable program code causing the computer to identify in the correspondence data store a correspondence causes an identification of a correspondence between the event and at least one task occurs in the response to an evaluation result of true.

28. The article of manufacture of claim 26 wherein,
the computer readable program code causing the computer to evaluate causes an evaluation of the identified predicate logic expression of condition so as to produce at least one of multiple possible evaluation result values; and
the computer readable program code causing the computer to identify in the correspondence data store a correspondence causes an indentification at least in part based upon the at least one evaluation result value.

29. The method of claim 26 wherein,
the computer readable program code causing the computer to evaluate causes an evaluation of the truth of the identified predicate logic expression of condition; and
the computer readable program code causing the computer to identify in the correspondence data store a correspondence causes an identification based upon the event if the evaluation result is true.

30. The method of claim 26 wherein,
the computer readable program code causing the computer to evaluate causes an evaluation of the identified predicate logic expression of condition so as to produce at least one of multiple possible evaluation results values; and
the computer readable program causing the computer to identify in the correspondence data store a correspondence causes identification at least in part based upon the event and the at least one evaluation result value.

31. The method of claim 30 further including:
the notice data store includes an application program data store of information;
wherein the computer readable program for causing the computer to evaluate causes an evaluation of condition relative to information in the application program store.

32. The method of claim 31 further including:
computer readable program for causing the computer to implement the data processing application.

33. A method of implementing a confition-to-action association in response to an event detected by a computer system programmed to run a relational database management system (RDBMS) comprising:
providing in a computer readable medium a data structure which includes,
an event data store of respective correspondences between respective event identifiers and respective predicate logic expressions of conditions;
a tasks data store of respective correspondences between respective task identifiers and respective groups of one or more command statements; and
a correspondence data store which includes respective correspondences between respective event identifiers and respective task identifiers; and
using the RDBMS to access the data structure by,
accessing the event data store to identify at least one predicate logic expression of condition corresponding to the detected event;
accessing the correspondence data store to identify a correspondence between the detected event and a task identifier; and
accessing the task data store to identify a respective group of one or more comman statements corresponding to the identified task identifier;
evaluating the identified at least one predicate logic expression of condition so as to produce an evaluation result for the event; and
invoking at least one command statement from the identified group of command statements or invoking none of the command statements from the identified group of command statements depending upon the produced evaluation result for the event.

34. The system of claim 33 wherein,
evaluating involves evaluating the truth of the at least one predicate logic expression of condition; and
accessing the correspondence data store to identify response information corresponding to the identified task occurs in response to an evaluation result of true.

35. The system of claim 33 wherein,
evaluating involves evaluating the at least one predicate logic expression of condition to produce at least one of multiple possible evaluation result values; and
accessing the correspondence data store to identify response information corresponding to the identified task involves accessing at least in part based upon the at least one evaluation result value.

36. The method of claim 33 wherein,
accessing the correspondence data store to identify response information corresponding to the identified task involves accessing based upon the event if the evaluation result is true.

37. The method of claim 33 wherein,
evaluating involves evaluating the predicate logic expression of condition to produce at least one of multiple possible evaluation result values; and
accessing the correspondence data store to identify response information corresponding to the identified task involves accessing at least in part based upon the event and the at least one evaluation result value.

38. The method of claim 33 further including:
providing in a computer readable medium an application program data store of information;
wherein evaluating involves evaluating the expression of condition relative to information in the application program store.

39. The method of claim 38 further including:
providing in computer readable medium an application program that uses information in the application program data store.

40. The method of claim 33 wherein at least one command statement can invoke a computer program.

41. The method of claim 33 wherein at least one command statement can invoke a relational database management system.

42. The method of claim 33 wherein,
at least one command statement can invoke a relational database management system or can invoke a computer program.

43. The method of claim 33 wherein,
the event data store is implemented in a event data store table;
the task data store is implemented in a task data store table; and
the correspondence data store is implemented in a correspondence data store table.

44. A computer system comprising:
an event data store of respective correspondences between respective event identifiers and respective predicate logic expressions of condition;
a task data store of respective correspondences between respective task identifiers and respective groups of one or more command statements;
a correspondence data store of respective correspondence between respective event identifiers and respective task identifiers;
means for detecting an event;
means for identifying from the event data store a respective predicate logic expression of condition corresponding to the event;
means for evaluating the identified predicate logic expression of conditions so as to produce an evaluation result for the event; and
means for identifying from the correspondence data store a correspondence between the event and at least one task identifier;
means for identifying from the task data store a respective group of one or more command statements corresponding to the at least one task; and means for causing execution of a respective command statement that corresponds to the at least one identified task identifier only if the produced evaluation result or the respective event has a prescribed value.

45. The system of claim 44 wherein,
said means for evaluating evaluates the truth of the identified predicate logic expression of condition; and
said means for identifying in the correspondence data store a correspondence between the event and at least one task identifies in response to an evaluation result of true.

46. The system of claim 44 wherein,
said means for evaluating evaluates the predicate logic expression of condition to produce at least one of multiple possible evaluation result values; and
said means for identifying in the correspondence data store a correspondence between the event and at least one task involves identifies at least in part based upon the at least one evaluation result value.

47. The method of claim 44 wherein,
said means for evaluating evaluates the truth of the identified predicate logic expression of condition; and
said means for identifying in the correspondence data store a correspondence between the event and at least one task involves identifies based upon the event if the evaluation result is true.

48. The method of claim 44 wherein,
said means for evaluating evaluates the predicate logic expression of condition to produce at least one of multiple possible evaluation result values; and
said means for identifying in the correspondence data store a correspondence between the event and at least one task identifies at least in part based upon the event and the at least one evaluation result value.

49. The method of claim 44 further including:
an application program data store of information;
wherein said means for evaluating evaluates the expression of condition relative to information in the application program store.

50. The method of claim 44 further including:
providing in computer readable medium an application program that uses information in the application program data store.

51. The method of claim 44 wherein at least one command statement can invoke a computer program.

52. The method of claim 44 wherein at least one command statement can invoke a relational database management system.

53. The method of claim 44 wherein,
at least one command statement can invoke a relational database management system or can invoke a computer program.

54. The method of claim 44 wherein,
the event data store is implemented in a event data store table;
the task data store is implemented in a task data store table; and
the correspondence data store is implemented in a correspondence data store table.

55. A method of processing information in a computer system that includes memory media encoded with a relational database management system (RDBMS) comprising:
providing in computer readable medium at least one event type table which can store respective correspondences between respective event type identifiers and respective predicate logic expressions of condition;
providing in computer readable medium at least one task type table that can store respective correspondences between respective task type identifiers and respective groups of one or more command statements;
providing in computer readable medium at least one correspondences table that can store a plurality of correspondences between respective event type identifiers and respective task type identifiers;
providing in computer readable medium a notice table that includes a notice data store at least one record indicative of an event that may trigger processing;
providing in computer readable medium at least one event occurrence table that corresponds to an event type and that can maintain a log of events;
providing in computer readable medium at least one task occurrence table that can maintain a log of tasks;
receiving a notice record in the notice data store table indicating an occurrence of an event;
using the RDBMS to search the event type table to identify an event type record that corresponds to the event indicated in the notice table;
specializing information from the identified event type record so as to create an event occurrence record and inserting the created event occurrence record in an event occurrence table corresponding to the identified event type;
evaluating information in the event occurrence record using a respective predicate logic expression of condition corresponding to the identified event type so as to produce a resulting value;
using the RDBMS to search the correspondence table to identify at least one task type that corresponds to the identified event type;
using the RDBMS to search the task type table to identify at least one task type record that corresponds to the at least one identified task type;
specializing information from the at least one identified task type record so as to create at least one task occurrence record and inserting the created task occurrence record in a task occurrence table corresponding to the at least one identified task type;
retrieving information from the at least one task occurrence record of the at least one task occurrence table; and
using at least one respective command statement from a respective group of one or more command statements corresponding to the identified task type to execute a response to the identified event only if the produced evaluation result has a prescribed value.

56. The method of claim 55 wherein the RDBMS executes the response.

57. The method of claim 55 wherein an operating system of the computer system executes the response.

58. The method of claim 55 further including:
performing the steps of,
using the RDBMS to search the correspondences table to identify at least one task type that corresponds to the identified event type;
using the RDBMS to search the task type table to identify at least one tank type record that corresponds to the at least one identified task type;
specializing information from the at least one identified task type record so as to create at least one task occurrence record and inserting the created task occurrence record in a task occurrence table corresponding to the at least one identified task type;
retrieving information from the at least one task occurrence record of the at least one task occurrence table;
only if the produced evaluation result for the respective event has a prescribed value.

* * * * *

UNITED STATES PATENT AND TRADEMARK OFFICE
CERTIFICATE OF CORRECTION

PATENT NO. : 6,421,667 B1
DATED : July 16, 2002
INVENTOR(S) : Edgar F. Codd et al.

It is certified that error appears in the above-identified patent and that said Letters Patent is hereby corrected as shown below:

Column 27,
Line 37, "comman" should be -- command --.

Column 29,
Line 38, "fromthe" should be -- from the --.

Column 30,
Lines 44, 52 and 62, "method" should be -- article of manufacture --.

Column 31,
Line 27, "comman" should be -- command --.
Lines 37-43, "system" should be -- method --.

Column 33,
Lines 1, 8, 17, 22, 26, 28, 31 and 36, "method" should be -- computer system --.

Signed and Sealed this

Eighth Day of April, 2003

JAMES E. ROGAN
*Director of the United States Patent and Trademark Office*